(12) United States Patent
Behrens et al.

(10) Patent No.: US 11,105,890 B2
(45) Date of Patent: Aug. 31, 2021

(54) FREQUENCY MODULATED SIGNAL CANCELLATION IN VARIABLE POWER MODE FOR RADAR APPLICATIONS

(71) Applicant: UHNDER, INC., Austin, TX (US)

(72) Inventors: Richard T. Behrens, Basalt, CO (US); Fred Harris, Lemon Grove, CA (US); Frederick Rush, Austin, TX (US); Monier Maher, St. Louis, MO (US); Curtis Davis, St. Louis, MO (US); Murtaza Ali, Cedar Park, TX (US)

(73) Assignee: Uhnder, Inc., Austin, TX (US)

( * ) Notice: Subject to any disclaimer, the term of this patent is extended or adjusted under 35 U.S.C. 154(b) by 258 days.

(21) Appl. No.: 16/220,121

(22) Filed: Dec. 14, 2018

(65) Prior Publication Data

US 2019/0187246 A1 Jun. 20, 2019

Related U.S. Application Data

(60) Provisional application No. 62/598,563, filed on Dec. 14, 2017.

(51) Int. Cl.
*G01S 7/02* (2006.01)
*G01S 7/35* (2006.01)
(Continued)

(52) U.S. Cl.
CPC .............. *G01S 7/023* (2013.01); *G01S 7/354* (2013.01); *G01S 13/325* (2013.01); *G01S 13/36* (2013.01); *G01S 13/931* (2013.01)

(58) Field of Classification Search
CPC ........... G01S 7/023; G01S 7/354; G01S 13/36
See application file for complete search history.

(56) References Cited

U.S. PATENT DOCUMENTS 1,882,128 A 10/1932 Fearing
3,374,478 A 3/1968 Blau
(Continued)

FOREIGN PATENT DOCUMENTS

EP 0725480 11/2011
EP 2374217 4/2013
(Continued)

OTHER PUBLICATIONS

Chambers et al., "An article entitled Real-Time Vehicle Mounted Multistatic Ground Penetrating Radar Imaging System for Buried Object Detection," Lawrence Livermore National Laboratory Reports (LLNL-TR-615452), Feb. 4, 2013; Retrieved from the Internet from https://e-reports-ext.llnl.gov/pdf/711892.pdf.
(Continued)

*Primary Examiner* — Marcus E Windrich
(74) *Attorney, Agent, or Firm* — Gardner, Linn, Burkhart & Ondersma LLP

(57) ABSTRACT

A radar system operated in a variable power mode includes transmitters, receivers, and a controller. The transmitters transmit digitally modulated signals. The receivers receive radio signals that include transmitted radio signals from the transmitter and reflected from objects in the environment. In addition, an interfering radar signal from a different radar system is received that has been linearly frequency modulated. Each receiver includes a linear frequency modulation canceler that includes a FIR filter, and is configured as a 1-step linear predictor with least mean squares adaptation to attempt to cancel the interfering signal. The prediction is subtracted from the FIR input signal that drives the adaptation and also comprises the canceler output. The controller is configured to control the adaptation on a first receiver. The controller delays the adaptation such that transients at the start of each receive pulse are avoided.

16 Claims, 26 Drawing Sheets

(51) Int. Cl.
   *G01S 13/36*    (2006.01)
   *G01S 13/931*   (2020.01)
   *G01S 13/32*    (2006.01)

(56) References Cited

U.S. PATENT DOCUMENTS

| | | | |
|---|---|---|---|
| 3,735,398 A | 5/1973 | Ross | |
| 3,750,169 A | 7/1973 | Strenglein | |
| 3,896,434 A | 7/1975 | Sirven | |
| 4,078,234 A | 3/1978 | Fishbein et al. | |
| 4,176,351 A | 11/1979 | De Vita et al. | |
| 4,566,010 A | 1/1986 | Collins | |
| 4,882,668 A | 11/1989 | Schmid et al. | |
| 4,910,464 A | 3/1990 | Trett et al. | |
| 4,939,685 A | 7/1990 | Feintuch | |
| 5,001,486 A | 3/1991 | Bächtiger | |
| 5,034,906 A | 7/1991 | Chang | |
| 5,087,918 A | 2/1992 | May et al. | |
| 5,151,702 A | 9/1992 | Urkowitz | |
| 5,175,710 A | 12/1992 | Hutson | |
| 5,218,619 A | 6/1993 | Dent | |
| 5,272,663 A | 12/1993 | Jones et al. | |
| 5,280,288 A | 1/1994 | Sherry et al. | |
| 5,302,956 A | 4/1994 | Asbury et al. | |
| 5,341,141 A | 8/1994 | Frazier et al. | |
| 5,345,470 A | 9/1994 | Alexander | |
| 5,376,939 A | 12/1994 | Urkowitz | |
| 5,379,322 A | 1/1995 | Kosaka et al. | |
| 5,497,162 A | 3/1996 | Kaiser | |
| 5,508,706 A | 4/1996 | Tsou et al. | |
| 5,581,464 A | 12/1996 | Woll et al. | |
| 5,654,715 A | 8/1997 | Hayashikura et al. | |
| 5,657,021 A | 8/1997 | Ehsani-Nategh et al. | |
| 5,657,023 A | 8/1997 | Lewis et al. | |
| 5,682,605 A * | 10/1997 | Salter | H04B 1/707 |
| | | | 375/145 |
| 5,691,724 A | 11/1997 | Aker et al. | |
| 5,712,640 A | 1/1998 | Andou | |
| 5,724,041 A | 3/1998 | Inoue et al. | |
| 5,847,661 A | 12/1998 | Ricci | |
| 5,892,477 A | 4/1999 | Wehling | |
| 5,917,430 A | 6/1999 | Greneker, III et al. | |
| 5,920,285 A | 7/1999 | Benjamin | |
| 5,931,893 A | 8/1999 | Dent et al. | |
| 5,959,571 A | 9/1999 | Aoyagi et al. | |
| 5,970,400 A | 10/1999 | Dwyer | |
| 6,067,314 A | 5/2000 | Azuma | |
| 6,069,581 A | 5/2000 | Bell et al. | |
| 6,121,872 A | 9/2000 | Weishaupt | |
| 6,121,918 A | 9/2000 | Tullsson | |
| 6,151,366 A | 11/2000 | Yip | |
| 6,163,252 A | 12/2000 | Nishiwaki | |
| 6,184,829 B1 | 2/2001 | Stilp | |
| 6,191,726 B1 | 2/2001 | Tullsson | |
| 6,288,672 B1 | 9/2001 | Asano et al. | |
| 6,307,622 B1 | 10/2001 | Lewis | |
| 6,335,700 B1 | 1/2002 | Ashihara | |
| 6,347,264 B2 | 2/2002 | Nicosia et al. | |
| 6,400,308 B1 | 6/2002 | Bell et al. | |
| 6,411,250 B1 | 6/2002 | Oswald et al. | |
| 6,417,796 B1 | 7/2002 | Bowlds | |
| 6,424,289 B2 | 7/2002 | Fukae et al. | |
| 6,583,753 B1 | 6/2003 | Reed | |
| 6,614,387 B1 | 9/2003 | Deadman | |
| 6,624,784 B1 | 9/2003 | Yamaguchi | |
| 6,674,908 B1 | 1/2004 | Aronov | |
| 6,683,560 B2 | 1/2004 | Bauhahn | |
| 6,714,956 B1 | 3/2004 | Liu et al. | |
| 6,747,595 B2 | 6/2004 | Hirabe | |
| 6,768,391 B1 | 7/2004 | Dent et al. | |
| 6,865,218 B1 | 3/2005 | Sourour | |
| 6,888,491 B2 | 5/2005 | Richter | |
| 6,975,246 B1 | 12/2005 | Trudeau | |
| 7,119,739 B1 | 10/2006 | Struckman | |
| 7,289,058 B2 | 10/2007 | Shima | |
| 7,299,251 B2 | 11/2007 | Skidmore et al. | |
| 7,338,450 B2 | 3/2008 | Kristofferson et al. | |
| 7,395,084 B2 | 7/2008 | Anttila | |
| 7,460,055 B2 | 12/2008 | Nishijima et al. | |
| 7,474,258 B1 | 1/2009 | Arikan et al. | |
| 7,545,310 B2 | 6/2009 | Matsuoka | |
| 7,545,321 B2 | 6/2009 | Kawasaki | |
| 7,564,400 B2 | 7/2009 | Fukuda | |
| 7,567,204 B2 | 7/2009 | Sakamoto | |
| 7,609,198 B2 | 10/2009 | Chang | |
| 7,642,952 B2 | 1/2010 | Fukuda | |
| 7,663,533 B2 | 2/2010 | Toennesen | |
| 7,728,762 B2 | 6/2010 | Sakamoto | |
| 7,791,528 B2 | 9/2010 | Klotzbuecher | |
| 7,847,731 B2 | 12/2010 | Wiesbeck et al. | |
| 7,855,677 B2 | 12/2010 | Negoro et al. | |
| 7,859,450 B2 | 12/2010 | Shirakawa et al. | |
| 8,019,352 B2 | 9/2011 | Rappaport et al. | |
| 8,044,845 B2 | 10/2011 | Saunders | |
| 8,049,663 B2 | 11/2011 | Frank et al. | |
| 8,059,026 B1 | 11/2011 | Nunez | |
| 8,102,306 B2 | 1/2012 | Smith, Jr. et al. | |
| 8,154,436 B2 | 4/2012 | Szajnowski | |
| 8,212,713 B2 | 7/2012 | Aiga et al. | |
| 8,330,650 B2 | 12/2012 | Goldman | |
| 8,390,507 B2 | 3/2013 | Wintermantel | |
| 8,471,760 B2 | 6/2013 | Szajnowski | |
| 8,532,159 B2 | 9/2013 | Kagawa et al. | |
| 8,547,988 B2 | 10/2013 | Hadani et al. | |
| 8,686,894 B2 | 4/2014 | Fukuda et al. | |
| 8,694,306 B1 | 4/2014 | Short et al. | |
| 8,994,581 B1 | 3/2015 | Brown | |
| 9,121,943 B2 | 9/2015 | Stirlin-Gallacher et al. | |
| 9,239,378 B2 | 1/2016 | Kishigami et al. | |
| 9,239,379 B2 | 1/2016 | Burgio et al. | |
| 9,282,945 B2 | 3/2016 | Smith et al. | |
| 9,335,402 B2 | 5/2016 | Maeno et al. | |
| 9,400,328 B2 | 7/2016 | Hsiao et al. | |
| 9,541,639 B2 | 1/2017 | Searcy et al. | |
| 9,568,600 B2 | 2/2017 | Alland | |
| 9,575,160 B1 | 2/2017 | Davis et al. | |
| 9,599,702 B1 | 3/2017 | Bordes et al. | |
| 9,689,967 B1 | 6/2017 | Stark et al. | |
| 9,720,073 B1 | 8/2017 | Davis et al. | |
| 9,720,080 B1 | 9/2017 | Rodenbeck | |
| 9,753,121 B1 | 9/2017 | Davis | |
| 9,753,132 B1 | 9/2017 | Bordes et al. | |
| 9,772,397 B1 | 9/2017 | Bordes et al. | |
| 9,791,551 B1 | 10/2017 | Eshraghi et al. | |
| 9,791,564 B1 | 10/2017 | Harris et al. | |
| 9,806,914 B1 | 10/2017 | Bordes et al. | |
| 9,829,567 B1 | 11/2017 | Davis et al. | |
| 9,846,228 B2 | 12/2017 | Davis et al. | |
| 9,869,762 B1 | 1/2018 | Alland et al. | |
| 2001/0002919 A1 | 6/2001 | Sourour et al. | |
| 2002/0004692 A1 | 1/2002 | Nicosia et al. | |
| 2002/0044082 A1 | 4/2002 | Woodington et al. | |
| 2002/0075178 A1 | 6/2002 | Woodington et al. | |
| 2002/0118522 A1 | 8/2002 | Ho et al. | |
| 2002/0130811 A1 | 9/2002 | Voigtlaender | |
| 2002/0147534 A1 | 10/2002 | Delcheccolo et al. | |
| 2002/0155811 A1 | 10/2002 | Prismantas | |
| 2003/0001772 A1 | 1/2003 | Woodington et al. | |
| 2003/0011519 A1 | 1/2003 | Breglia et al. | |
| 2003/0058166 A1 | 3/2003 | Hirabe | |
| 2003/0073463 A1 | 4/2003 | Shapira | |
| 2003/0080713 A1 | 5/2003 | Kirmuss | |
| 2003/0102997 A1 | 6/2003 | Levin et al. | |
| 2003/0235244 A1 | 12/2003 | Pessoa et al. | |
| 2004/0012516 A1 | 1/2004 | Schiffmann | |
| 2004/0015529 A1 | 1/2004 | Tanrikulu et al. | |
| 2004/0066323 A1 | 4/2004 | Richter | |
| 2004/0107030 A1 | 6/2004 | Nishira et al. | |
| 2004/0138802 A1 | 7/2004 | Kuragaki et al. | |
| 2004/0215373 A1 | 10/2004 | Won et al. | |
| 2005/0069162 A1 | 3/2005 | Haykin | |
| 2005/0090274 A1 | 4/2005 | Miyashita | |
| 2005/0156780 A1 | 7/2005 | Bonthron et al. | |
| 2005/0201457 A1 | 9/2005 | Allred et al. | |

(56) References Cited

U.S. PATENT DOCUMENTS

| | | |
|---|---|---|
| 2005/0225476 A1 | 10/2005 | Hoetzel et al. |
| 2005/0273480 A1 | 12/2005 | Pugh et al. |
| 2006/0012511 A1 | 1/2006 | Dooi et al. |
| 2006/0036353 A1 | 2/2006 | Wintermantel |
| 2006/0050707 A1 | 3/2006 | Sterin |
| 2006/0093078 A1 | 5/2006 | Lewis et al. |
| 2006/0109170 A1 | 5/2006 | Voigtlaender et al. |
| 2006/0109931 A1 | 5/2006 | Asai |
| 2006/0114324 A1 | 6/2006 | Farmer et al. |
| 2006/0140249 A1 | 6/2006 | Kohno |
| 2006/0181448 A1 | 8/2006 | Natsume et al. |
| 2006/0244653 A1 | 11/2006 | Szajnowski |
| 2006/0262007 A1 | 11/2006 | Bonthron |
| 2006/0262009 A1* | 11/2006 | Watanabe ............... G01S 7/36 342/159 |
| 2007/0018884 A1 | 1/2007 | Adams |
| 2007/0018886 A1 | 1/2007 | Watanabe et al. |
| 2007/0096885 A1 | 5/2007 | Cheng et al. |
| 2007/0109175 A1 | 5/2007 | Fukuda |
| 2007/0115869 A1 | 5/2007 | Lakkis |
| 2007/0120731 A1 | 5/2007 | Kelly, Jr. et al. |
| 2007/0132633 A1 | 6/2007 | Uchino |
| 2007/0152870 A1 | 7/2007 | Woodington et al. |
| 2007/0152871 A1 | 7/2007 | Puglia |
| 2007/0152872 A1 | 7/2007 | Woodington |
| 2007/0164896 A1 | 7/2007 | Suzuki et al. |
| 2007/0171122 A1 | 7/2007 | Nakano |
| 2007/0182619 A1 | 8/2007 | Honda et al. |
| 2007/0182623 A1 | 8/2007 | Zeng |
| 2007/0188373 A1 | 8/2007 | Shirakawa et al. |
| 2007/0200747 A1 | 8/2007 | Okai |
| 2007/0263748 A1 | 11/2007 | Mesecher |
| 2007/0279303 A1 | 12/2007 | Schoebel |
| 2008/0088499 A1 | 4/2008 | Bonthron |
| 2008/0094274 A1 | 4/2008 | Nakanishi |
| 2008/0150790 A1 | 6/2008 | Voigtlaender et al. |
| 2008/0180311 A1 | 7/2008 | Mikami |
| 2008/0208472 A1 | 8/2008 | Morcom |
| 2008/0218406 A1 | 9/2008 | Nakanishi |
| 2008/0258964 A1 | 10/2008 | Schoeberl |
| 2008/0272955 A1 | 11/2008 | Yonak et al. |
| 2009/0003412 A1 | 1/2009 | Negoro et al. |
| 2009/0015459 A1 | 1/2009 | Mahler et al. |
| 2009/0015464 A1 | 1/2009 | Fukuda |
| 2009/0027257 A1 | 1/2009 | Arikan |
| 2009/0046000 A1 | 2/2009 | Matsuoka |
| 2009/0051581 A1 | 2/2009 | Hatono |
| 2009/0072957 A1 | 3/2009 | Wu et al. |
| 2009/0073025 A1 | 3/2009 | Inoue et al. |
| 2009/0074031 A1 | 3/2009 | Fukuda |
| 2009/0079617 A1 | 3/2009 | Shirakawa et al. |
| 2009/0085827 A1 | 4/2009 | Orime et al. |
| 2009/0103593 A1 | 4/2009 | Bergamo |
| 2009/0121918 A1 | 5/2009 | Shirai et al. |
| 2009/0212998 A1 | 8/2009 | Szajnowski |
| 2009/0237293 A1 | 9/2009 | Sakuma |
| 2009/0254260 A1 | 10/2009 | Nix et al. |
| 2009/0267822 A1 | 10/2009 | Shinoda et al. |
| 2009/0289831 A1 | 11/2009 | Akita |
| 2009/0295623 A1 | 12/2009 | Falk |
| 2010/0001897 A1 | 1/2010 | Lyman |
| 2010/0019950 A1 | 1/2010 | Yamano et al. |
| 2010/0039311 A1 | 2/2010 | Woodington et al. |
| 2010/0116365 A1 | 5/2010 | McCarty |
| 2010/0156690 A1 | 6/2010 | Kim et al. |
| 2010/0198513 A1 | 8/2010 | Zeng et al. |
| 2010/0253573 A1 | 10/2010 | Holzheimer et al. |
| 2010/0277359 A1 | 11/2010 | Ando |
| 2010/0289692 A1 | 11/2010 | Winkler |
| 2011/0006944 A1 | 1/2011 | Goldman |
| 2011/0032138 A1 | 2/2011 | Krapf |
| 2011/0074620 A1 | 3/2011 | Wintermantel |
| 2011/0187600 A1 | 8/2011 | Landt |
| 2011/0196568 A1 | 8/2011 | Nickolaou |
| 2011/0248796 A1 | 10/2011 | Pozgay |
| 2011/0279303 A1 | 11/2011 | Smith, Jr. et al. |
| 2011/0279307 A1 | 11/2011 | Song |
| 2011/0285576 A1 | 11/2011 | Lynam |
| 2011/0291874 A1 | 12/2011 | De Mersseman |
| 2011/0291875 A1 | 12/2011 | Szajnowski |
| 2011/0292971 A1 | 12/2011 | Hadani et al. |
| 2011/0298653 A1 | 12/2011 | Mizutani |
| 2012/0001791 A1 | 1/2012 | Wintermantel |
| 2012/0050093 A1 | 3/2012 | Heilmann et al. |
| 2012/0105268 A1 | 5/2012 | Smits et al. |
| 2012/0112957 A1 | 5/2012 | Nguyen et al. |
| 2012/0133547 A1 | 5/2012 | MacDonald et al. |
| 2012/0173246 A1 | 7/2012 | Choi et al. |
| 2012/0195349 A1 | 8/2012 | Lakkis |
| 2012/0249356 A1 | 10/2012 | Shope |
| 2012/0257643 A1 | 10/2012 | Wu et al. |
| 2012/0283987 A1* | 11/2012 | Busking ............... G01S 13/825 702/159 |
| 2012/0314799 A1 | 12/2012 | In De Betou et al. |
| 2012/0319900 A1 | 12/2012 | Johansson et al. |
| 2013/0016761 A1 | 1/2013 | Nentwig |
| 2013/0021196 A1 | 1/2013 | Himmelstoss |
| 2013/0027240 A1 | 1/2013 | Chowdhury |
| 2013/0069818 A1 | 3/2013 | Shirakawa et al. |
| 2013/0102254 A1 | 4/2013 | Cyzs |
| 2013/0113647 A1 | 5/2013 | Sentelle et al. |
| 2013/0113652 A1 | 5/2013 | Smits et al. |
| 2013/0113653 A1 | 5/2013 | Kishigami et al. |
| 2013/0135140 A1 | 5/2013 | Kishigami |
| 2013/0169468 A1 | 7/2013 | Johnson et al. |
| 2013/0169485 A1 | 7/2013 | Lynch |
| 2013/0176154 A1 | 7/2013 | Bonaccio et al. |
| 2013/0214961 A1 | 8/2013 | Lee et al. |
| 2013/0229301 A1 | 9/2013 | Kanamoto |
| 2013/0244710 A1 | 9/2013 | Nguyen et al. |
| 2013/0249730 A1 | 9/2013 | Adcook |
| 2013/0314271 A1 | 11/2013 | Braswell et al. |
| 2013/0321196 A1 | 12/2013 | Binzer et al. |
| 2014/0022108 A1 | 1/2014 | Alberth, Jr. et al. |
| 2014/0028491 A1 | 1/2014 | Ferguson |
| 2014/0035774 A1 | 2/2014 | Khlifi |
| 2014/0070985 A1 | 3/2014 | Vacanti |
| 2014/0085128 A1 | 3/2014 | Kishigami et al. |
| 2014/0097987 A1 | 4/2014 | Worl et al. |
| 2014/0111367 A1 | 4/2014 | Kishigami et al. |
| 2014/0111372 A1 | 4/2014 | Wu |
| 2014/0139322 A1 | 5/2014 | Wang et al. |
| 2014/0159948 A1 | 6/2014 | Ishimori et al. |
| 2014/0220903 A1 | 8/2014 | Schulz et al. |
| 2014/0253345 A1 | 9/2014 | Breed |
| 2014/0253364 A1 | 9/2014 | Lee et al. |
| 2014/0285373 A1 | 9/2014 | Kuwahara et al. |
| 2014/0316261 A1 | 10/2014 | Lux et al. |
| 2014/0327566 A1 | 11/2014 | Burgio et al. |
| 2014/0340254 A1 | 11/2014 | Hesse |
| 2014/0348253 A1 | 11/2014 | Mobasher et al. |
| 2015/0002329 A1 | 1/2015 | Murad et al. |
| 2015/0002357 A1 | 1/2015 | Sanford et al. |
| 2015/0035662 A1 | 2/2015 | Bowers et al. |
| 2015/0061922 A1 | 3/2015 | Kishigami |
| 2015/0103745 A1 | 4/2015 | Negus et al. |
| 2015/0198709 A1 | 7/2015 | Inoue |
| 2015/0204966 A1 | 7/2015 | Kishigami |
| 2015/0204971 A1 | 7/2015 | Yoshimura et al. |
| 2015/0204972 A1 | 7/2015 | Kuehnle et al. |
| 2015/0226848 A1 | 8/2015 | Park |
| 2015/0234045 A1 | 8/2015 | Rosenblum |
| 2015/0247924 A1 | 9/2015 | Kishigami |
| 2015/0255867 A1 | 9/2015 | Inoue |
| 2015/0301172 A1 | 10/2015 | Ossowska |
| 2015/0323660 A1 | 11/2015 | Hampikian |
| 2015/0331090 A1 | 11/2015 | Jeong et al. |
| 2015/0369912 A1 | 12/2015 | Kishigami et al. |
| 2016/0003938 A1 | 1/2016 | Gazit et al. |
| 2016/0003939 A1 | 1/2016 | Stainvas Olshansky et al. |
| 2016/0018511 A1 | 1/2016 | Nayyar et al. |
| 2016/0033631 A1 | 2/2016 | Searcy et al. |
| 2016/0033632 A1 | 2/2016 | Searcy et al. |
| 2016/0041260 A1 | 2/2016 | Cao et al. |

(56) References Cited

U.S. PATENT DOCUMENTS

| | | |
|---|---|---|
| 2016/0054441 A1 | 2/2016 | Kuo et al. |
| 2016/0061935 A1 | 3/2016 | McCloskey et al. |
| 2016/0084941 A1 | 3/2016 | Arage |
| 2016/0084943 A1 | 3/2016 | Arage |
| 2016/0091595 A1 | 3/2016 | Alcalde |
| 2016/0103206 A1 | 4/2016 | Pavao-Moreira et al. |
| 2016/0124075 A1 | 5/2016 | Vogt et al. |
| 2016/0124086 A1 | 5/2016 | Jansen et al. |
| 2016/0131752 A1 | 5/2016 | Jansen et al. |
| 2016/0139254 A1 | 5/2016 | Wittenberg |
| 2016/0146931 A1 | 5/2016 | Rao et al. |
| 2016/0154103 A1 | 6/2016 | Moriuchi |
| 2016/0178732 A1 | 6/2016 | Oka et al. |
| 2016/0213258 A1 | 7/2016 | Lashkari et al. |
| 2016/0223644 A1* | 8/2016 | Soga .............. G01S 7/023 |
| 2016/0238694 A1 | 8/2016 | Kishigami |
| 2016/0349365 A1 | 12/2016 | Ling |
| 2017/0010361 A1 | 1/2017 | Tanaka |
| 2017/0023661 A1 | 1/2017 | Richert |
| 2017/0023663 A1 | 1/2017 | Subburaj et al. |
| 2017/0074980 A1 | 3/2017 | Adib |
| 2017/0117950 A1 | 4/2017 | Strong |
| 2017/0153316 A1 | 6/2017 | Wintermantel |
| 2017/0219689 A1 | 8/2017 | Hung et al. |
| 2017/0234968 A1 | 8/2017 | Roger et al. |
| 2017/0293025 A1 | 10/2017 | Davis et al. |
| 2017/0293027 A1 | 10/2017 | Stark et al. |
| 2017/0307728 A1 | 10/2017 | Eshraghi et al. |
| 2017/0309997 A1 | 10/2017 | Alland et al. |
| 2017/0310758 A1 | 10/2017 | Davis et al. |
| 2017/0336495 A1 | 11/2017 | Davis et al. |
| 2018/0003799 A1* | 1/2018 | Yang .............. G01S 13/93 |
| 2018/0019755 A1* | 1/2018 | Josefsberg .............. H03L 7/07 |
| 2018/0149730 A1* | 5/2018 | Li .............. G01S 7/023 |
| 2020/0064455 A1* | 2/2020 | Schroder .............. G01S 13/36 |

FOREIGN PATENT DOCUMENTS

| | | |
|---|---|---|
| EP | 2821808 | 7/2015 |
| FR | 2751086 | 1/1998 |
| WO | WO2015175078 | 11/2015 |
| WO | WO2015185058 | 12/2015 |
| WO | WO2016011407 | 1/2016 |
| WO | WO2016030656 | 3/2016 |
| WO | WO2017187330 | 11/2017 |

OTHER PUBLICATIONS

Fraser, "Design and simulation of a coded sequence ground penetrating radar," In: Diss. University of British Columbia, Dec. 3, 2015.

Zhou et al., "Linear extractors for extracting randomness from noisy sources," In: Information Theory Proceedings (ISIT), 2011 IEEE International Symposium on Oct. 3, 2011.

V. Giannini et al., "A 79 GHz Phase-Modulated 4 GHz-BW CW Radar Transmitter in 28 nm CMOS," in IEEE Journal of Solid-State Circuits, vol. 49, No. 12, pp. 2925-2937, Dec. 2014. (Year: 2014).

Oscar Faus García, "Signal Processing for mm Wave MIMO Radar," University of Gavle, Faculty of Engineering and Sustainable Development, Jun. 2015; Retrieved from the Internet from http://www.diva-portal.se/smash/get/diva2:826028/FULLTEXT01.pdf.

* cited by examiner

FREQUENCY MODULATED SIGNAL CANCELLATION IN VARIABLE POWER MODE FOR RADAR APPLICATIONS

CROSS REFERENCE TO RELATED APPLICATIONS

The present application claims the filing benefits of U.S. provisional application, Ser. No. 62/598,563, filed Dec. 14, 2017, which is hereby incorporated by reference herein in its entirety.

FIELD OF THE INVENTION

The present invention is directed to radar systems, and more particularly to radar systems for vehicles.

BACKGROUND

The use of radar to determine range, angle, and velocity of objects in an environment is important in a number of applications including automotive radar and gesture detection. A radar system typically transmits a signal and "listens" for the reflection of the signal from objects in the environment. By comparing the transmitted signal with the timing of the received signal, a radar system can determine the distance to an object. By observing the Doppler shift in the frequency of the reflected signal relative to the transmitted signal, the velocity of the object can also be determined. Moreover, by using multiple transmitters and/or receivers, the location (angle) of the object can also be determined.

There are several types of waveforms used in different types of radar systems. One type of waveform or radar signal is known as a frequency-modulated continuous waveform (FMCW). In an FMCW-type radar system, the transmitter of the radar system sends a continuous signal in which the frequency of the signal varies. This is sometimes called a chirp radar system. Mixing (multiplying) a waveform reflected from an object (also known as a target) with a replica of the transmitted signal results in a CW signal with a frequency that represents the distance between the radar transmitter/receiver and the target. By sweeping up in frequency and then down in frequency, the Doppler frequency can also be determined. Another type of waveform used in a radar system is known as a phase-modulated continuous waveform (PMCW). In a PMCW-type radar system the transmitter of the radar system sends a continuous signal in which the phase of the signal varies. By filtering the received signal with a filter matched to the transmitted signal the autocorrelation of the signal is generated. This will have large magnitude peaks at time delays corresponding to the round trip distance between the transmitter and receiver.

SUMMARY

Methods and systems of the present invention include a PMCW radar system that includes transmitters for transmitting radio signals that are phase modulated, and receivers for receiving radio signals that include transmitted radio signals transmitted by the transmitters and reflected from objects in the environment. The received radio signals include frequency modulated signal interference from other sources. Their frequency modulated signals deviate the carrier signal frequency from a mean or center frequency according to linear frequency transitions. Good performance in mitigating frequency modulated signal interference may be achieved with reduced transient levels at the beginning of each receive pulse by delaying adaptation of a linear frequency modulation canceler (FCU), such that coefficients of finite impulse response (FIR) filters of the FCU are filled with valid signal samples before the adaptation. During the delay, a training pass may be used to supply the valid signal samples. Each of the receivers will include an FCU for mitigating the frequency modulated signal interference.

In accordance with an aspect of the present invention, a radar system for a vehicle includes transmitters, receivers, and a controller for controlling the transmitters and receivers. The transmitters transmit phase-modulated radio signals. The receivers are configured to receive radio signals that include transmitted radio signals transmitted by the transmitters and reflected from objects in the environment. The receivers are further configured to receive frequency modulated signal interference transmitted by another source. Each receiver of the plurality of receivers includes a linear frequency modulation canceler configured to cancel or mitigate any frequency-modulated signal interference. A linear frequency modulation canceller includes a FIR filter and is configured as a 1-step linear predictor with least mean squares adaptation. The prediction is subtracted from the FIR input signal that drives the adaptation and also comprises the canceler output.

In accordance with an aspect of the present invention, a method for mitigating frequency modulated interference in a radar sensing system includes providing a plurality of transmitters configured for installation and use on a vehicle. A plurality of receivers are provided that are configured for installation and use on the vehicle. Phase-modulated radio signals are transmitted with the transmitters. Radio signals are received with the receivers. The received radio signals include at least one of: transmitted radio signals transmitted by the transmitters and reflected from objects in the environment, and interfering frequency-modulated radio signals transmitted by another radar sensing system. The transmitters and receivers are controlled such that the transmitters and the receivers operate in alternating transmit and receive windows. Each receiver of the plurality of receivers comprises a linear frequency modulation canceler. A linear frequency modulation canceler mitigates any interfering frequency-modulated signals received by an associated receiver, such that the associated receiver is able to estimate a location of an object.

In accordance with an aspect of the present invention, a radar sensing system includes a transmitter, a receiver, and a controller. The transmitter is configured to transmit phase-modulated continuous wave radio signals. The receiver is configured to receive radio signals that include (i) the transmitted radio signals transmitted by the transmitter and reflected from objects in the environment, and (ii) interfering frequency-modulated radio signals transmitted by another radar sensing system. The controller is configured to control the transmitter and the receiver such that the transmitter and the receiver operate in alternating transmit and receive windows. The receiver also includes a frequency modulation canceller configured to cancel a substantial portion of the interfering radio signals received by the receiver, such that the receiver is able to estimate a location of an object.

In an aspect of the present invention, the controller is configured to control the adaptation on a first receiver. Optionally, FIR coefficients for all the other receivers of the plurality of receivers are copied from the first receiver. The controller may also delay the adaptation such that transients at the start of each receive pulse are avoided.

In accordance with a further aspect of the present invention, the controller is configured to delay the FIR adaptation until a delay line of the FIR filter has filled with valid signal samples. Before the FIR adaptation begins, a training pass is performed to fill FIR filter coefficients with the samples. Furthermore, the training pass is run backwards so that the FIR filter coefficients at the end of the training correspond to a chirp frequency at the beginning of the pulse.

These and other objects, advantages, purposes and features of the present invention will become apparent upon review of the following specification in conjunction with the drawings.

DETAILED DESCRIPTION

Figure 1:
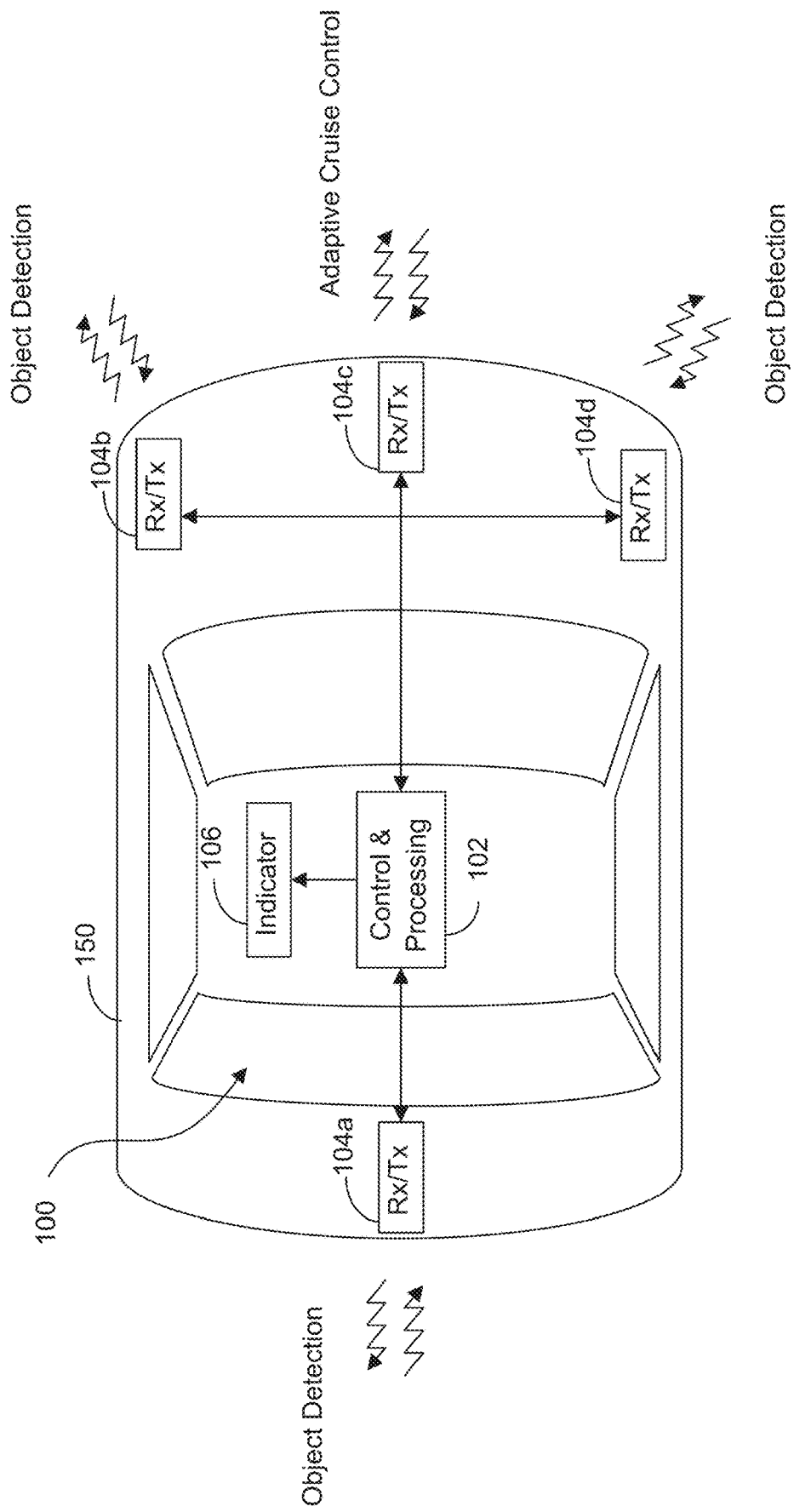
FIG. 1 is a plan view of an automobile equipped with one or more radar systems in accordance with the present invention.

The present invention will now be described with reference to the accompanying figures, wherein numbered elements in the following written description correspond to like-numbered elements in the figures. Methods and systems of the present invention may achieve a good performance in mitigating frequency-modulated signal interference with reduced transient levels at the beginning of each receive pulse or window by delaying adaptation of a linear frequency modulation canceler (FCU), such that coefficients of FIR filters of the FCU are filled with valid signal samples before the adaptation.

There are several different types of radar systems. The most well-known is pulse radar, in which a very short pulse of very high-power microwave energy is transmitted during which time the receiver is blanked to prevent overload or damage; then the receiver is unblanked and listens for echoes received with various delays. The length of time the receiver can listen before the next transmitter pulse equates to the maximum range. The antenna may rotate between pulses to test for reflecting objects at different azimuths or elevations or both.

A less common variation of the above is the bistatic radar system in which the transmitter is not co-located with the receiver and uses a totally different antenna. The receiver thereby does not need to be blanked during the transmit pulse.

In pulse radar systems, the transmitter duty factor and therefore the mean power is small; therefore, to achieve enough sensitivity for long range performance a high peak pulse power must be used. To overcome that, another type of radar called continuous wave (CW) radar is used. A CW radar transmits and receives all the time. The transmitted signal has features in its waveform that enable the receiver to determine the delay of a received signal by determining the time difference between the transmitted feature and the received feature. In FMCW-type radar systems, the feature used is the instantaneous frequency. The transmitter frequency is changed linearly and very rapidly from a starting value to an ending value to create what is known as a chirp. A delayed signal will be received at an earlier value of the chirp frequency. By forming a beat between the transmit frequency and the received frequency in the receive mixer, and determining the beat frequency, which is the transmit-receive frequency difference, the delay of the reflected chirp can be calculated. Because such a frequency difference cannot be distinguished from Doppler, a forward and backward chirp may be used alternately, producing a sawtooth frequency modulation. Any Doppler has an opposite effect on interpreting the forward chirp compared to the backward chirp, thus allowing range and Doppler to be separated. In FMCW radar systems, one issue is the extreme accuracy and linearity needed for the chirp signal. The greatest issue in CW radar is receiving at the same time as transmitting. The transmitted signal is much stronger than any received echo and can overload the receiver's limited dynamic range. Improving the frequency modulation performance of FMCW-type radar systems is described in detail in U.S. Publication No. US-2017-0307728, which is hereby incorporated by reference herein in its entirety.

Another version of CW radar called pulse-CW radar aims to reduce the difficulty of receiving weak echoes from distant objects in the presence of the strong own transmitter signal. This is similar to pulse radar except that the transmitter duty factor is much higher, for example 50%. A modulated transmit pulse is transmitted for a duration that fills up the time to the furthest object and then switches off. The receiver receives strong echoes from nearby objects while the transmitter is transmitting, but when weak echoes from distant objects are received, the transmitter has already switched off so that there are no signals being received from nearby objects. This facilitates detection of distant objects. Improving near-far performance in radar systems is described in detail in U.S. Pat. No. 9,753,121 ("the '121 patent"), which is hereby incorporated by reference herein in its entirety.

The invention is described primarily for use in a digital PMCW radar in which transmission and reception occur alternately at a same site and the interference is an FMCW type of radar. As discussed herein, FMCW-type radars may also be operated such that transmission and reception occur simultaneously. Hybrid radars can also be made in which transmission and reception are simultaneous for a first period and then the transmitter switches off to allow the receiver to receive weak, late echoes without strong interference from the local transmitter, as discussed in the '121 patent. As noted above, FMCW radar typically used chirp signals to determine range and Doppler.

Radars with a single transmitter and a single receiver can determine distance to a target but cannot accurately determine a direction or an angle of a target from the radar sensor or system unless the antenna pattern is steered between pulses either mechanically or electronically using a phased-array. To acquire angular information for each radar pulse period, which in the case of the exemplary radar system described herein comprises a sequence of frequency modulating bits with which the receiver performs correlation, either multiple transmitter antennas or multiple receiver antennas or both are needed, and which are operative in all directions all the time. Each receiver receives and separates each echoed transmitter signal, thus resulting in N x M received results, where N is the number of transmitters and M is the number of receivers. These signals can be individually processed to determine range and velocity. With proper design, these N x M signals from different virtual receivers/radars can be combined in any number of ways according to a plurality of beamforming vectors, thereby achieving elevation and azimuth location of each object as well as range and Doppler information.

The larger the number of transmitter antennas and receiver antennas, the better the resolution possible. Each transmission antenna is connected to a separate transmitter, and each receiver antenna is connected to a separate receiver. As discussed herein, such a radar system is known as a multiple-input, multiple-output (MIMO) radar system.

Figure 4:
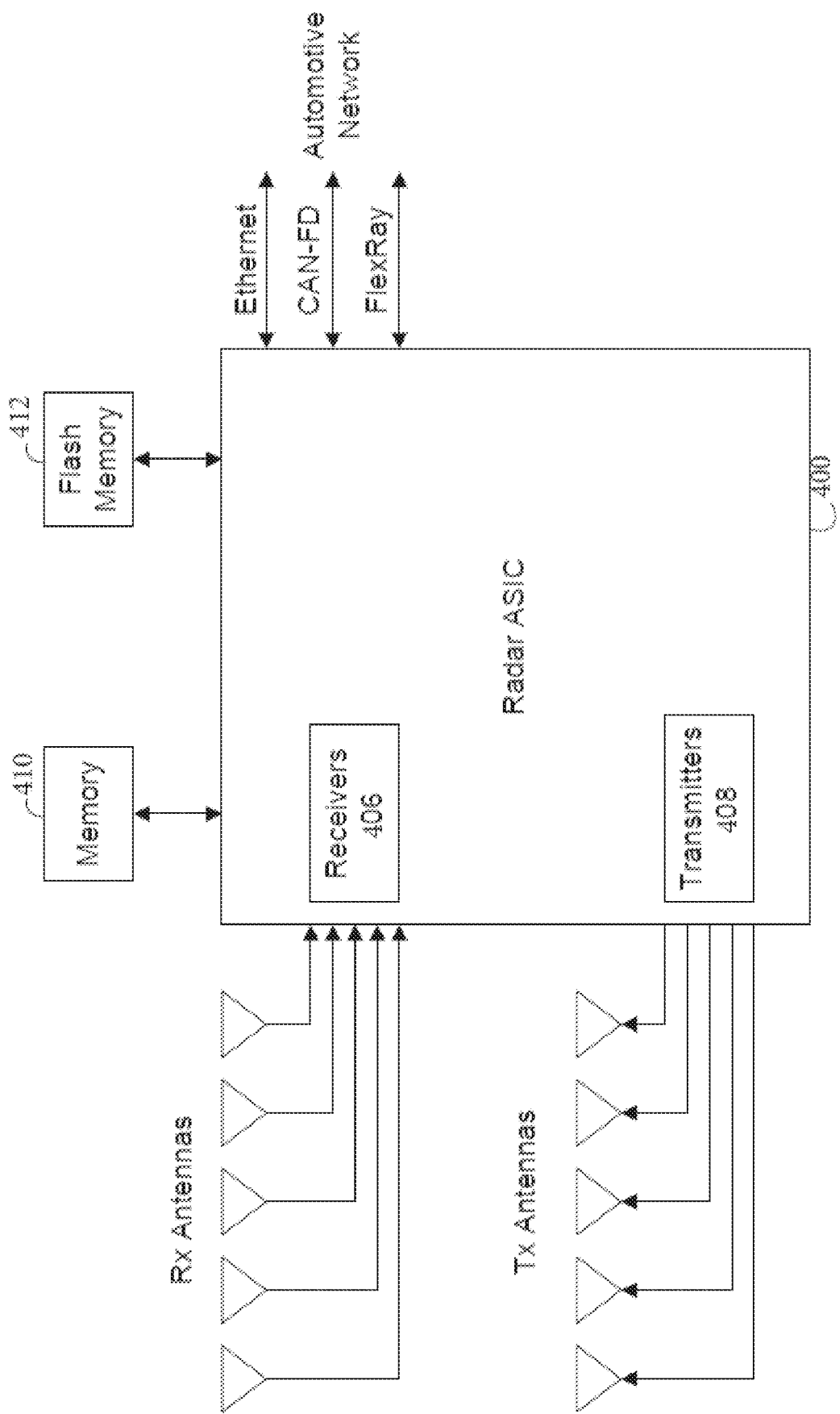
FIG. 4 is a block diagram illustrating a radar system with a plurality of receivers and a plurality of transmitters (MIMO radar) for producing the data structures of FIG. 3, in accordance with the present invention.

An exemplary MIMO radar system is illustrated in FIG. 4. With MIMO radar systems, each transmitter signal is rendered distinguishable from every other transmitter by using appropriate differences in the modulation, for example, different digital code sequences. Each receiver correlates with each transmitter signal, producing a number of correlated outputs equal to the product of the number of receivers with the number of transmitters. The outputs are deemed to have been produced by a number of virtual receivers, which can exceed the number of physical receivers. A receiver may be referred to as a virtual receiver even when there is only a single transmitter, in order to avoid changing the terminology. The output of a given receiver receiving a transmitted signal from a given transmitter has a phase that depends on the round-trip distance from the transmitting antenna to the receiving antenna. Each transmit-receive combination produces a different phase due to the separation of their antennas. By combining the outputs for each transmitter/receiver combination while correcting for these different phase shifts, a combined output is obtained that only constructively adds for a target at a unique point in space. By repeating the combination using the precomputed phase shifts for many different points in space, signals may be resolved in the three dimensions of range, azimuth, and elevation. The focusing effect of the above phase coherent combining is effective for resolution in azimuth and elevation but only contributes to range resolution at very short ranges, and the range resolution at long ranges is principally determined by the round-trip delay of the digital modulation. An exemplary radar system according to the invention therefore determines the range of a target or the distance to a target principally by determining how long it takes an echo of transmitted RF signals to be heard back at the receivers. From this measured time-delay and knowing that the electromagnetic RF signals travel at the speed of light (or ultrasonic signals traveling at the speed of sound), the distance can be determined.

Figure 3:
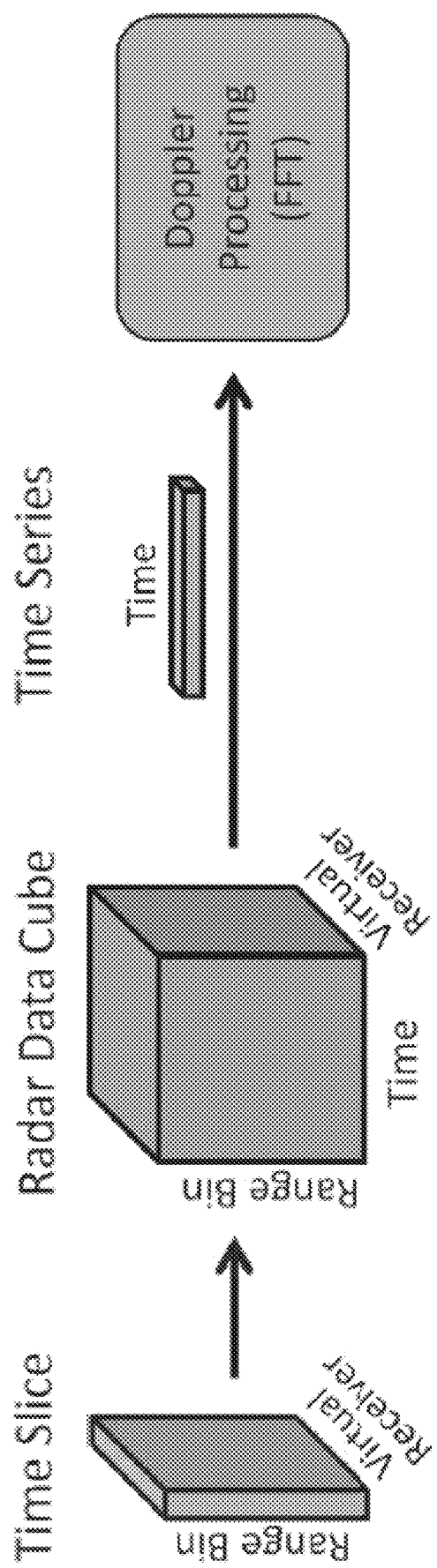
FIG. 3 is a block diagram illustrating a flow of data structures through a radar system in accordance with the present invention.

In digital PMCW radar, the method of determining the time delay is accomplished by correlating a received RF signal with multiple time-shifts of the digital modulating code to produce correlations which are stored in range bins. The length of time over which coherent correlations can be performed is limited by the phase rotation caused by Doppler shift. To continue cumulative correlation for longer times than this, partial correlations are combined while compensating for the Doppler-induced phase drift. The partial correlations may be stored for each virtual receiver and range in a 3-dimensional array called a radar data cube, as illustrated in FIG. 3, in which the three dimensions are virtual receiver number, range, and time or index of the partial correlation. Partial correlations for the same receiver and range are then submitted to an FFT, which combines them in a computationally efficient manner with many different hypotheses of the rate-of-change of phase, thus producing long correlations for each of a number of Doppler bins. The result is then stored in a radar data cube having the dimensions of virtual receiver number, range, and Doppler shift. Thus, the radar data cube time dimension has been converted into a Doppler shift dimension which is more meaningful for characterizing a reflecting target or object as stationary or moving. Then, for the same range and Doppler bin, the results across different virtual receivers may be combined by using beamforming matrices as mentioned above in order to achieve angular resolution in azimuth, elevation or both.

Because there can be multiple objects in the environment, there will be multiple bins in the radar cube for which there will be a high correlation. While a virtual receiver/radar could correlate the received RF signal with all possible delays, generally there is a finite set of delays with which the virtual receiver/radar will correlate, that is, a finite set of range bins over the range of interest. Likewise, there will be a finite set of Doppler bins up to the maximum conceivable relative velocity between the radar and an oncoming vehicle. Because the transmission and return range changes at twice the relative velocity of the target to the radar, the maximum Doppler shift may be based on either twice the maximum speed of any one vehicle if the vehicle is approaching the radar or negative twice the maximum speed if the vehicle is going away from the radar. The possible range of Doppler is then four times the maximum speed of a vehicle. For a maximum vehicle speed of 250 km/hr, which can be reached on the German Autobahn for example, the maximum range of Doppler shift can be 1000 km/hr, which is 74 KHz at 80 GHz. If a radar system's own velocity, which is presumed to be known, is digitally removed by applying a systematic phase de-twisting to the received data, the maximum range of Doppler shift drops to 37 KHz.

The radar sensing system of the present invention may utilize aspects of the radar systems described in U.S. Pat. Nos. 9,846,228; 9,806,914; 9,791,564; 9,791,551; 9,772,397; 9,753,121; 9,599,702; 9,575,160 and/or 9,689,967, and/or U.S. Publication Nos. US-2017-0309997; US-2017-0307728 and/or US-2017-0310758, and/or U.S. patent applications, Ser. No. 15/496,038, filed Apr. 25, 2017, and/or Ser. No. 15/705,627, filed Sep. 15, 2017, and/or U.S. provisional application Ser. No. 62/528,789, filed Jul. 5, 2017, which are all hereby incorporated by reference herein in their entireties.

FIG. 1 illustrates an exemplary radar system 100 configured for use in a vehicle 150. A vehicle 150 may be an automobile, truck, or bus, etc. As illustrated in FIG. 1, the radar system 100 may comprise one or more transmitters and one or more receivers 104a-104d which can be used jointly to realize a plurality of virtual receivers/radars. Other configurations are also possible. FIG. 1 illustrates a radar system 100 comprising one or more receivers/transmitters 104a-104d, control and processing module 102 and indicator 106. The receivers/transmitters 104a-104d are placed to acquire and provide data for object detection and adaptive cruise control. The radar system 100 (providing such object detection and adaptive cruise control or the like) may be part of an Advanced Driver Assistance System (ADAS) for the automobile 150.

Figure 2B:
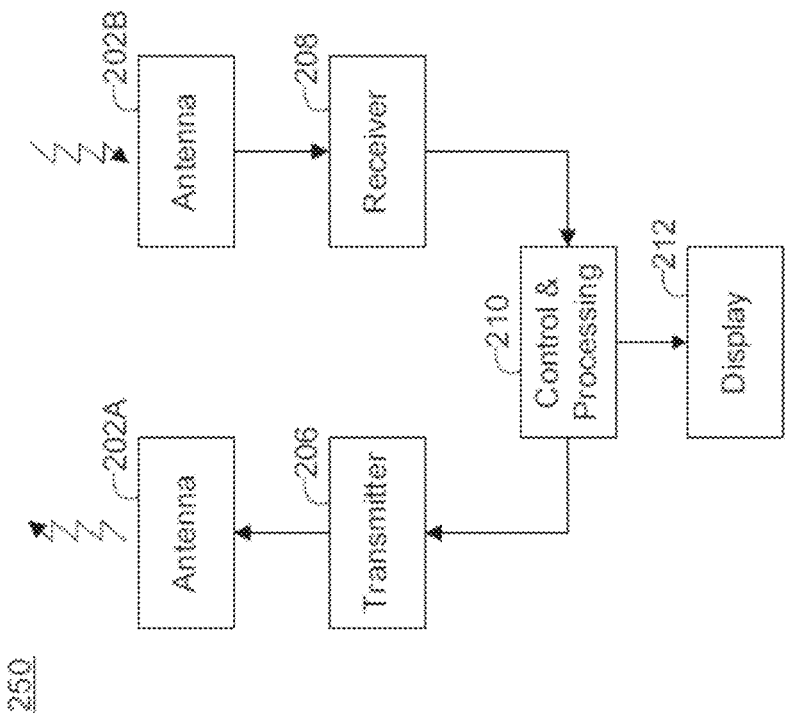
FIG. 2A and FIG. 2B are block diagrams of radar systems in accordance with the present invention.
Figure 2A:
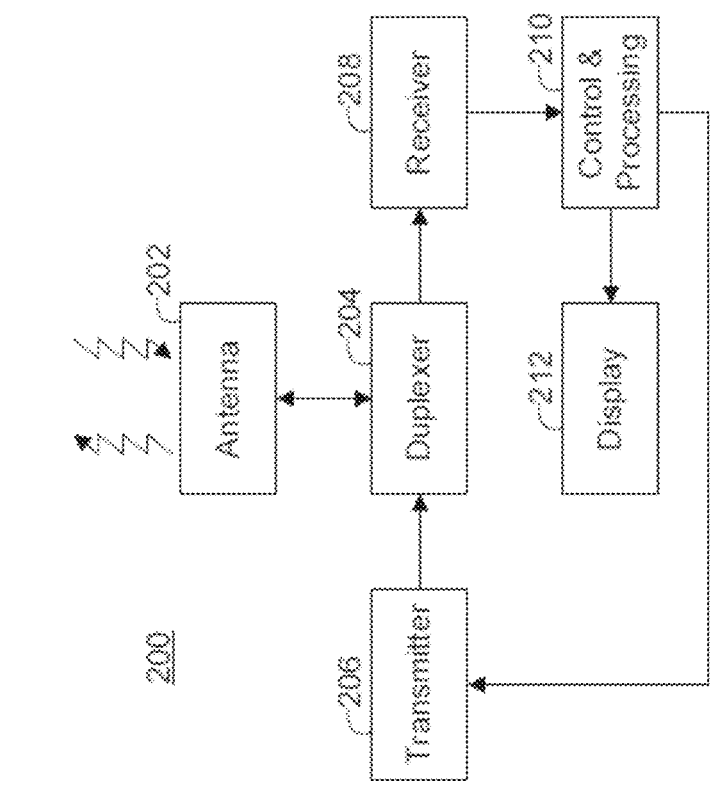

FIG. 2A illustrates an exemplary radar system 200 with an antenna 202 that is time-shared between a transmitter 206 and a receiver 208 via a duplexer 204. As also illustrated in FIG. 2A, output from the receiver 208 is received by a control and processing module 210 that processes the output from the receiver 208 to produce display data for the display 212. The control and processing module 210 is also operable to produce a radar data output that is provided to other control units. The control and processing module 210 is also operable to control the transmitter 206.

FIG. 2B illustrates an alternative exemplary radar system 250 with a pair of antennas 202a, 202b: an antenna 202a for the transmitter 206 and another antenna 202b for the receiver 208. While pulse radar systems may use shared or separate antennas, continuous-wave radars (discussed herein) will use separate antennas (for transmitting and receiving) because of their continuous operation. Despite using different antennas, local spillover from transmitter to receiver is a huge signal having a short delay. A critical issue in CW radar is the removal by subtraction of this large local spillover signal, for the success of which an accurately defined modulation, as is disclosed herein, is essential.

FIG. 4 illustrates an exemplary digitally-modulated continuous-wave radar system 400. Radar system 400 comprises a plurality of receivers and their respective antennas 406 and a plurality of transmitters and their respective antennas 408. The radar system 400 also includes a flash memory 412, and optionally a random-access memory 410. The random access memory 410, for example, an external DRAM, may be used to store radar data cube(s) instead of using the limited internal (on-chip) memory (e.g., SRAM), and may also be used to store selected range bins from a greater number of radar data cubes for post processing to improve Doppler resolution or range resolution by tracking objects using Kalman filtering. The radar system may also include a variety of interconnections to an automotive network, e.g., Ethernet, CAN-FD, and/or Flexray.

Often it is necessary to transmit a signal for a certain time duration and then turn off or reduce the power of the transmitter. This is so signals reflected from far objects that are very small are not dominated by large signals caused by reflections from objects closer to the radar than the far objects. This mode of operation, known as variable power mode, can help in the detection of the far objects in the presence of near objects. The variable power mode includes turning the receiver off while the reflections from the near objects are being received and then turning the transmitter down or off for a time duration so that the signals from the far objects can be received.

In addition to being able to detect far objects in the presence of near objects, it is also possible that a radar system can be subject to interference from other radars, either of the same type or different types. For example, an interfering radar of the FMCW type might be operating and causing interference to a radar system of the PMCW type. While techniques exist for mitigating the effect of an FMCW interfering radar on a PMCW victim radar where the receiver is operating continuously, there is a continuous need for improved radar techniques that achieve good interference mitigation performance when operating a PMCW-type radar system, such as in a variable power mode.

One significant problem with automotive radar systems is interference from other radar systems in other vehicles. Other radar systems may transmit an FMCW type of signal and cause interference to a victim radar. Because the radar system on another vehicle has only a one-way propagation loss, compared to a two-way or round-trip propagation loss of the signal from the victim radar to an object and then back, the received signal from an interfering radar might be much larger in power than the signal the victim radar is trying to use to estimate location of objects in the environment. A method of reducing the interference of an FMCW interfering radar was disclosed in U.S. Pat. No. 9,791,564 B1 ("the '564 Patent"), which is incorporate herein in the entirety.

Figure 24:
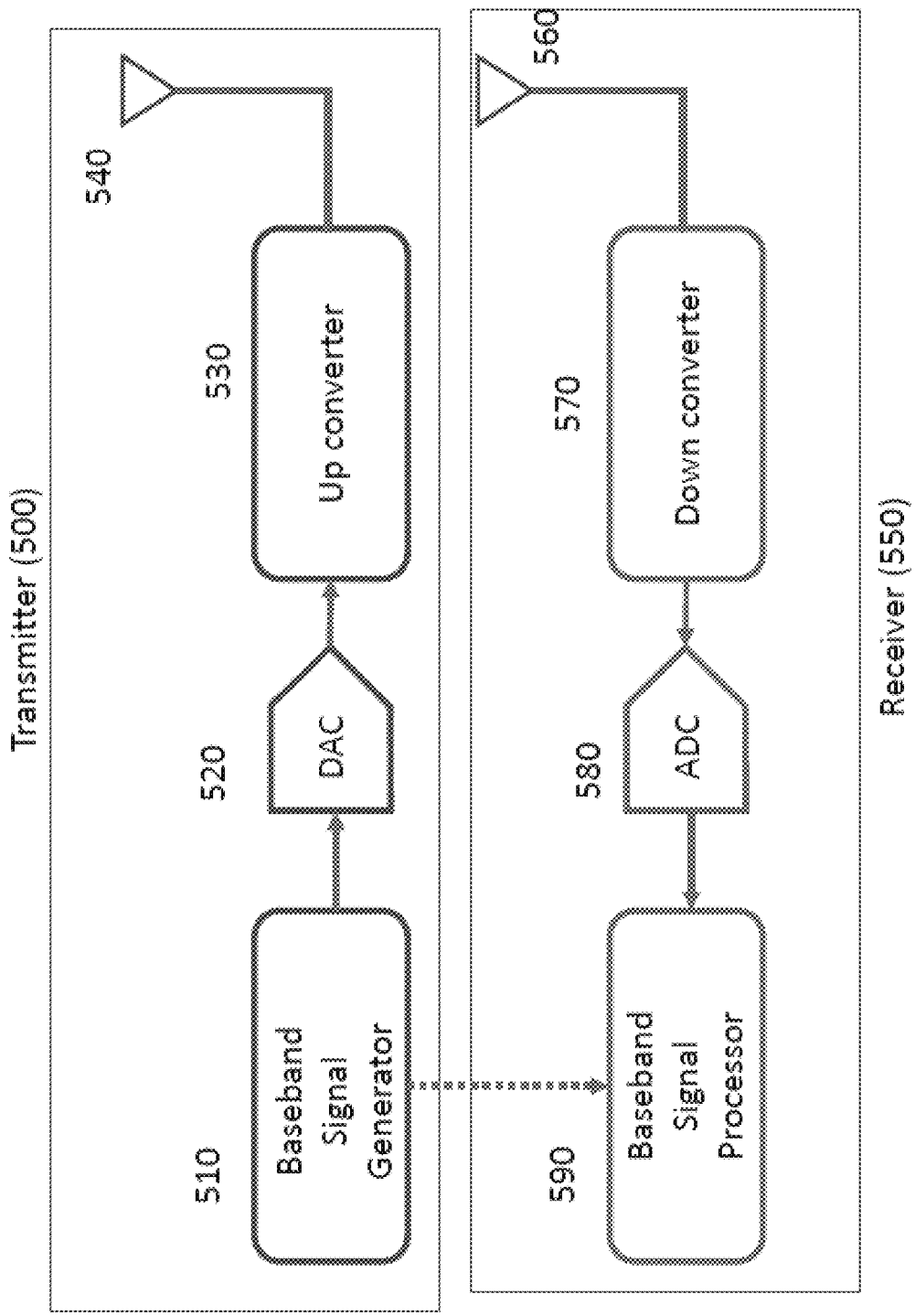
FIG. 24 is a block diagram illustrating basic processing blocks of a transmitter and receiver in an exemplary radar system in accordance with the present invention.
Figure 25:
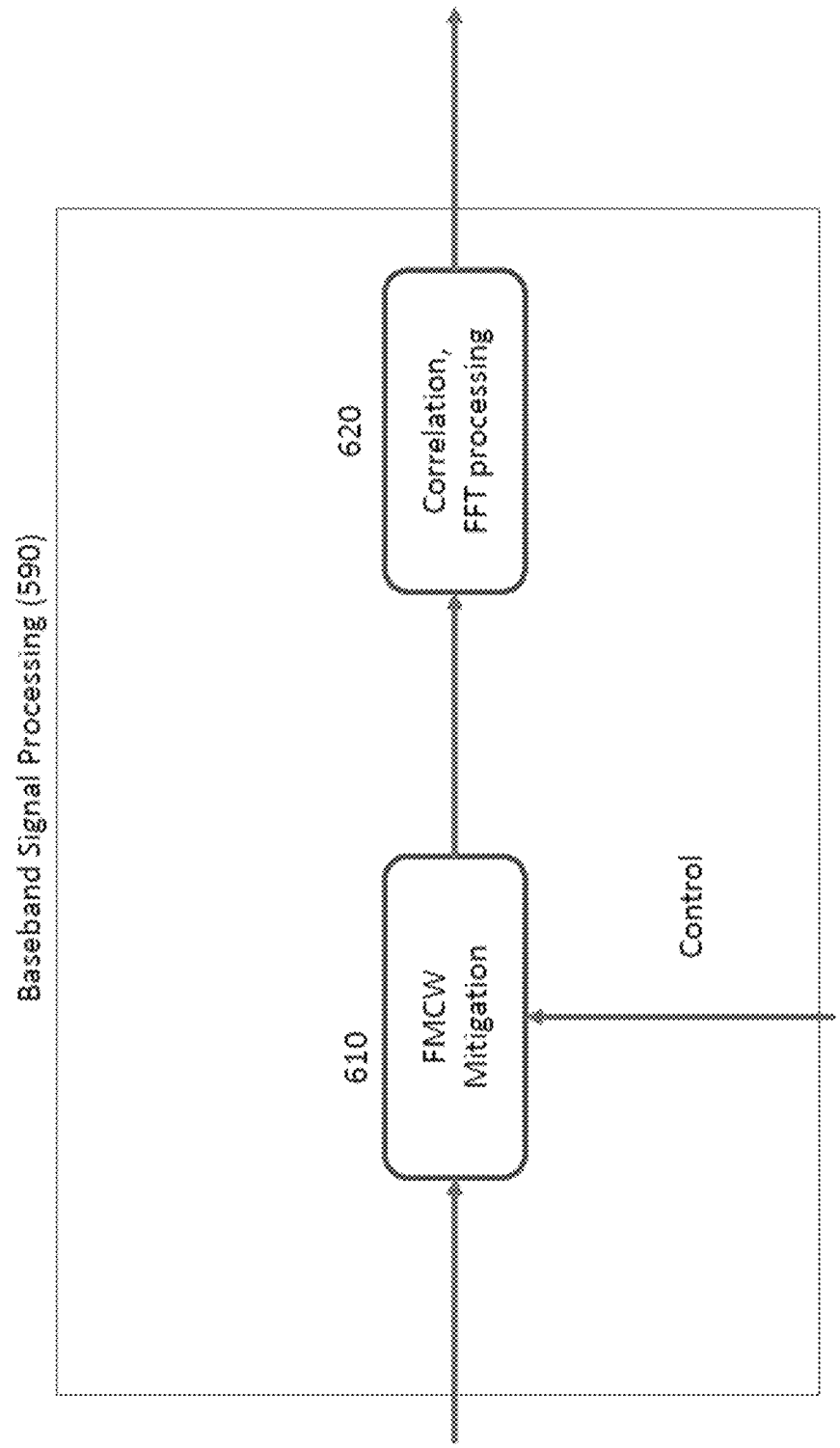
FIG. 25 is a block diagram illustrating an exemplary baseband signal processor in accordance with the present invention.
Figure 26:
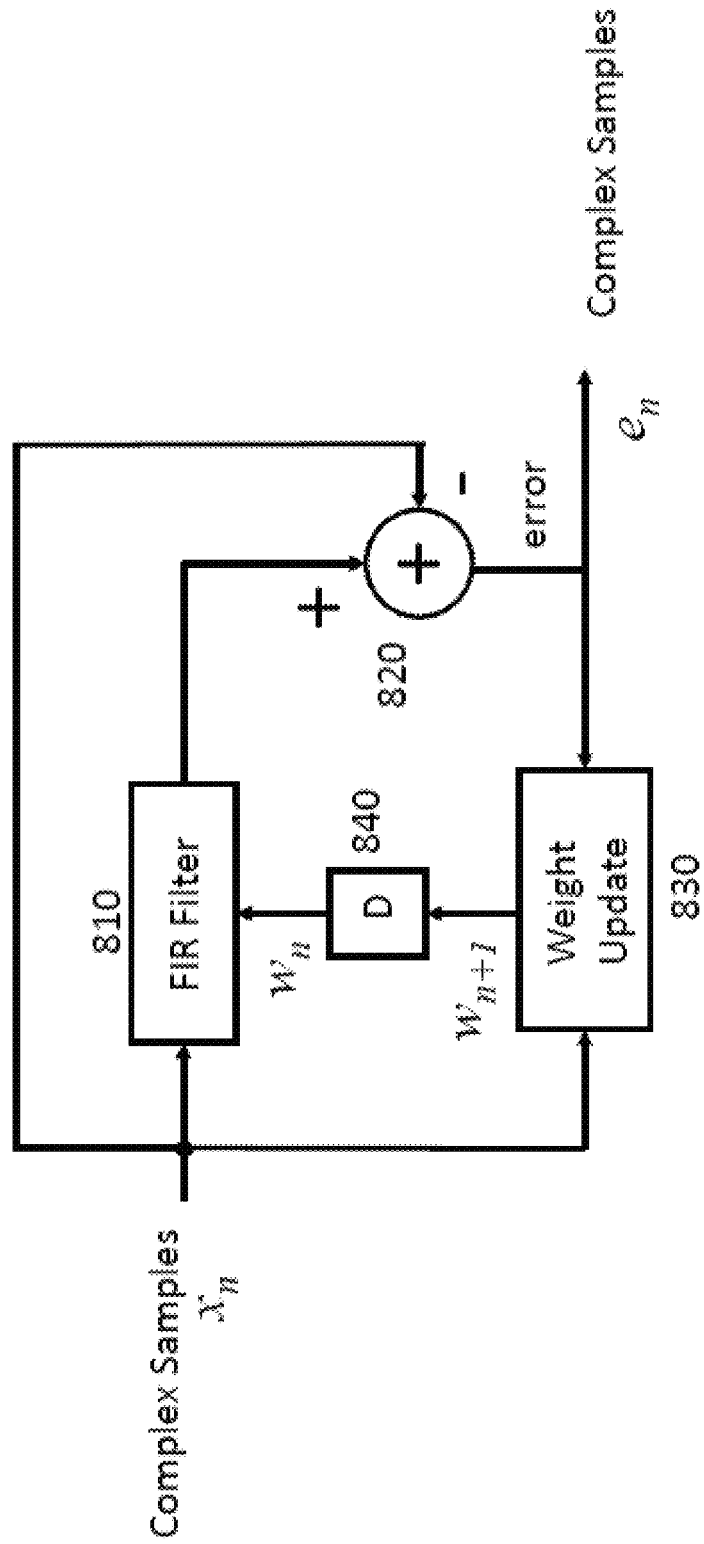
FIG. 26 is a block diagram illustrating an adaptive filter for frequency-modulated signal interference mitigation in accordance with the present invention.

An exemplary block diagram of a radar configured for mitigating an FMCW interfering signal is illustrated in FIG. 24. A baseband signal generator 510 is configured to generate a digital signal which is converted to an analog signal by a digital-to-analog converter 520 and then upconverted (530) before being transmitted by an antenna 540. At the receiver 550 the signal from the antenna 560 is down-converted and then converted into a digital signal by an ADC 580 before being processed digitally by a processor 590. The digital signal processing, illustrated in FIG. 25, includes an FMCW cancellation unit (FCU) 610 followed by correlation and FFT processing (620). The FCU unit 610 is illustrated in FIG. 26, in which a finite impulse response (FIR) filter 810 processes the samples to attempt to notch out the signal of the FMCW interferer. An error signal is generated at the output of an adder 820 and is used to update the weights (830) used in the filter. This loop (810, 820, 830, and 840) implements the adaptive filtering. The filter 810 is adaptively updated because the frequency of the FMCW signal is changing with time.

An exemplary radar sensing system with a linear frequency modulation (LFM) canceler (FCU) may consist of a complex-tap finite impulse response (FIR) filter per receiver path, configured as a 1-step linear predictor with least mean squares (LMS) adaptation. The programmability is limited to a maximum number of taps, with the preferred embodiment being a maximum of 15 taps. The prediction is then subtracted from the FIR input signal, which forms the error signal that drives the adaption and also comprises the FMCW canceller output (thus, effectively a 21-tap FIR with one coefficient fixed at 1.0). The adaption occurs only on one receiver path, and the FIR coefficients for all other receiver paths are copied from the adaptive path.

The '564 patent is directed towards a continuous operation of a receiver whereby the receiver is continuously processing the received signal. Because of the near-far problem whereby echoes received from nearby targets can drown out echoes received from distant targets (and interfere with the detection of far targets), an exemplary variable power mode can be employed whereby the transmitter power level is not constant. A particular realization of a variable power mode is where the transmitter is either ON or OFF. When the transmitter is OFF, and after the echoes from nearby objects/targets have been received, echoes from distant objects/targets can be received/detected without the echoes from the nearby objects interfering. Exemplary variable power modes can also include separate operational windows for both transmitter(s) and receiver(s). However, solutions developed for cancelling or mitigating frequency-modulated signal interference when the victim radar system is under continuous operation do not work as well when the victim radar system is operated in a variable power mode. The problem is that the frequency of an FMCW chirp that is to be cancelled will continue to change during any time when the receiver is disabled (and the receiver is blind), such that when the receiver starts operating again, this frequency error will cause a transient during which error residuals are large (cancellation is ineffective) until the adaptation re-settles.

Figure 5:
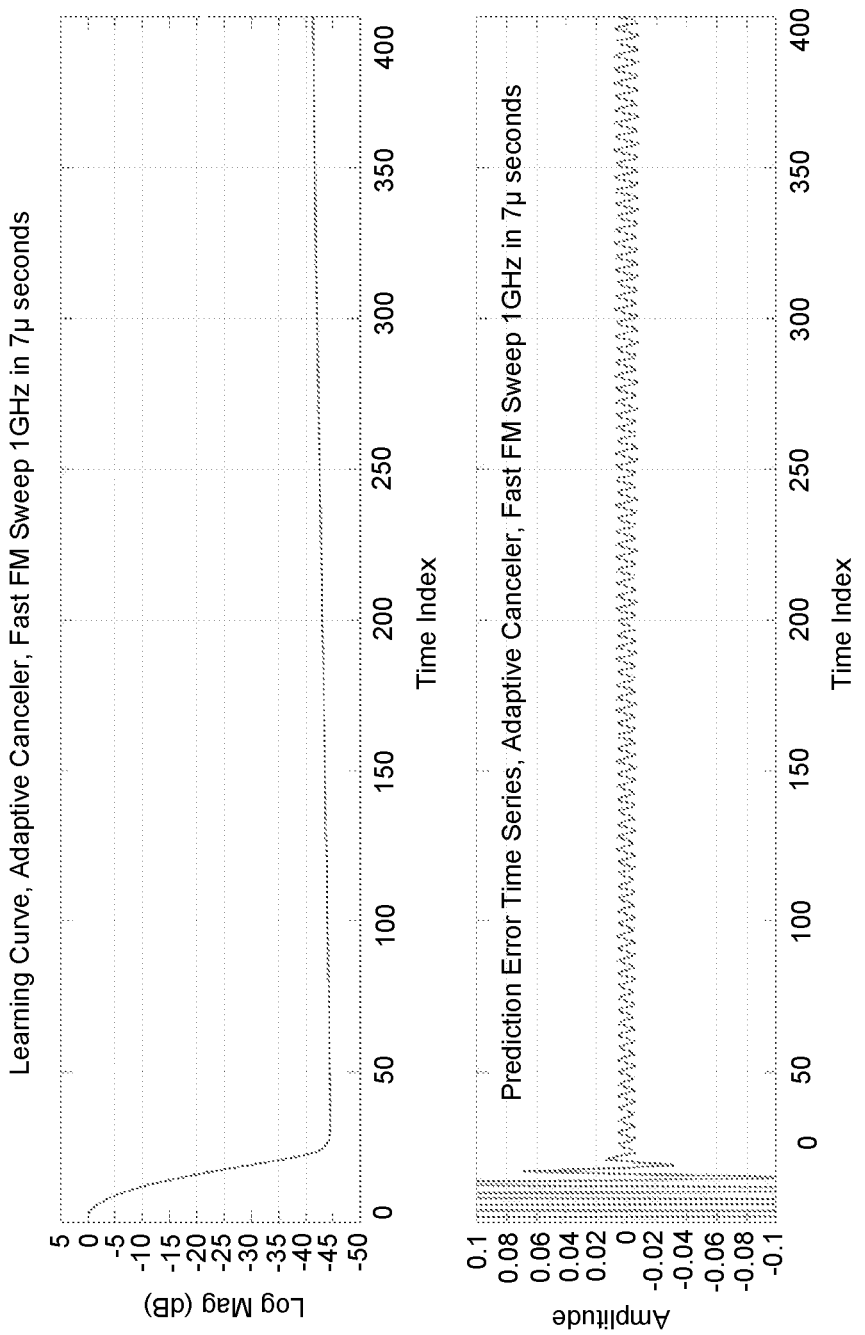
FIG. 5 is a graph illustrating an output of a simulated finite impulse response (FIR) adaptation in a continuous power mode in accordance with the present invention.
Figure 6:
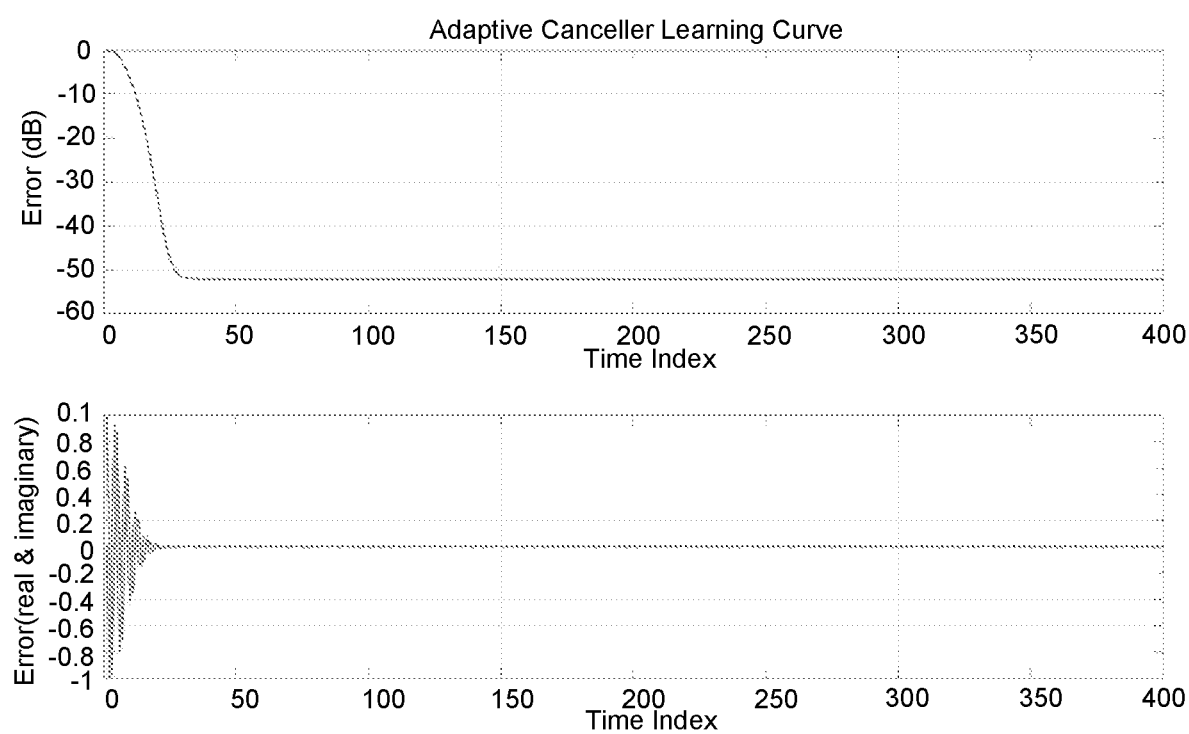
FIG. 6 is a graph illustrating exemplary setting curves with a constant frequency CW tone in accordance with the present invention.

Before addressing variable power modes, system behavior in a continuous power mode is discussed. The output of a simulated FIR adaptation in continuous power mode is illustrated in FIG. 5. The signal is well settled, in terms of error residual, within 30 samples. The residuals after that (which actually increase slightly from time index 30 through about time index 500 to a final size of about −40 dB) are due to the imperfect ability of the adaptation to follow the frequency change of the interfering signal as the FM chirp progresses. There is some frequency tracking lag, where the FIR notch is always a little bit behind the actual frequency of the interfering FMCW chirp as it ramps. FIG. 6 illustrates the settling curves with a constant frequency CW tone, which eliminates the effect of the lag on the notch tracking the chirp.

Figure 7:
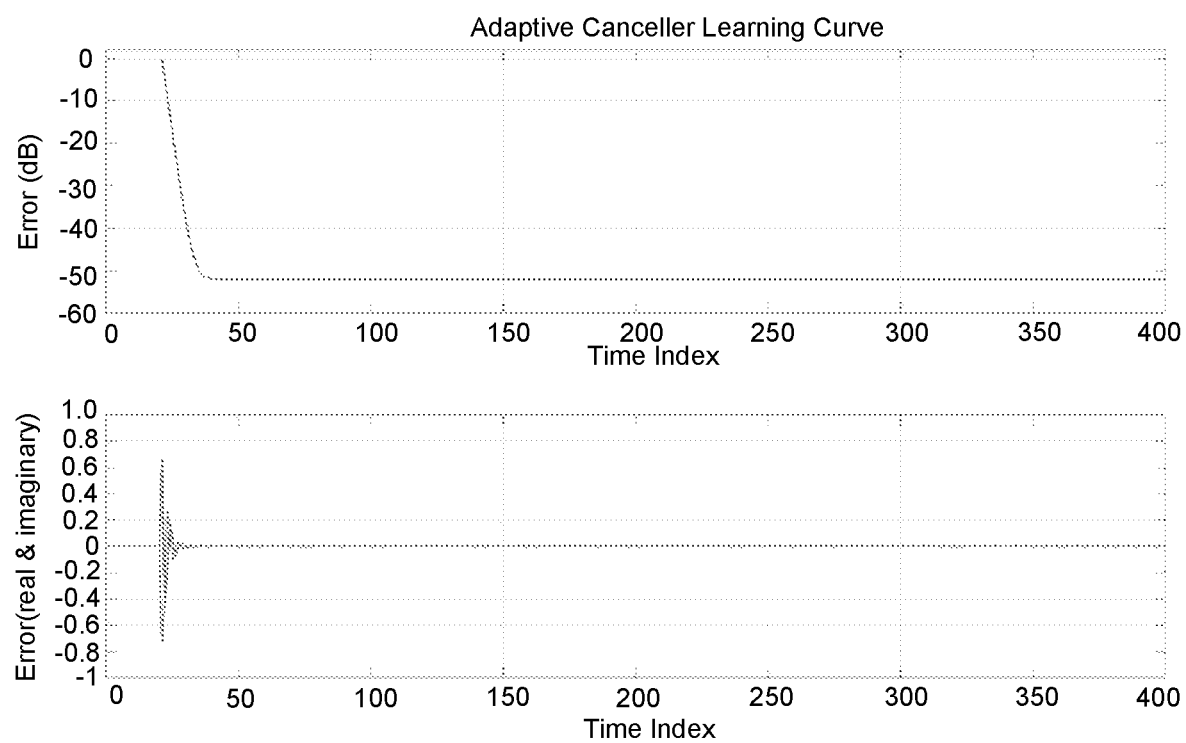
FIG. 7 is a graph illustrating a settling transient caused by starting a FIR adaptation before a delay line of the FIR filter has filled with valid signal samples in accordance with the present invention.

So, without tracking lag of the FM chirp, the final error floor is about −52 dB, which is lower than with the chirp enabled, and is achieved in about 30 samples of settling time. The level of the error floor (in this case, the −52 dB) is governed by a balance between the leakage coefficient (here set to 0.999) and the loop gain, mu (here set to 0.02). One contribution to the settling transient in this simulation is caused by starting the FIR adaptation before the 20-tap delay line of the FIR filter has filled with valid signal samples. This is illustrated in FIG. 7, where the variable hold_adapt_for_pipe_fill is set to TRUE in an updated MATLAB script.

Figure 8:
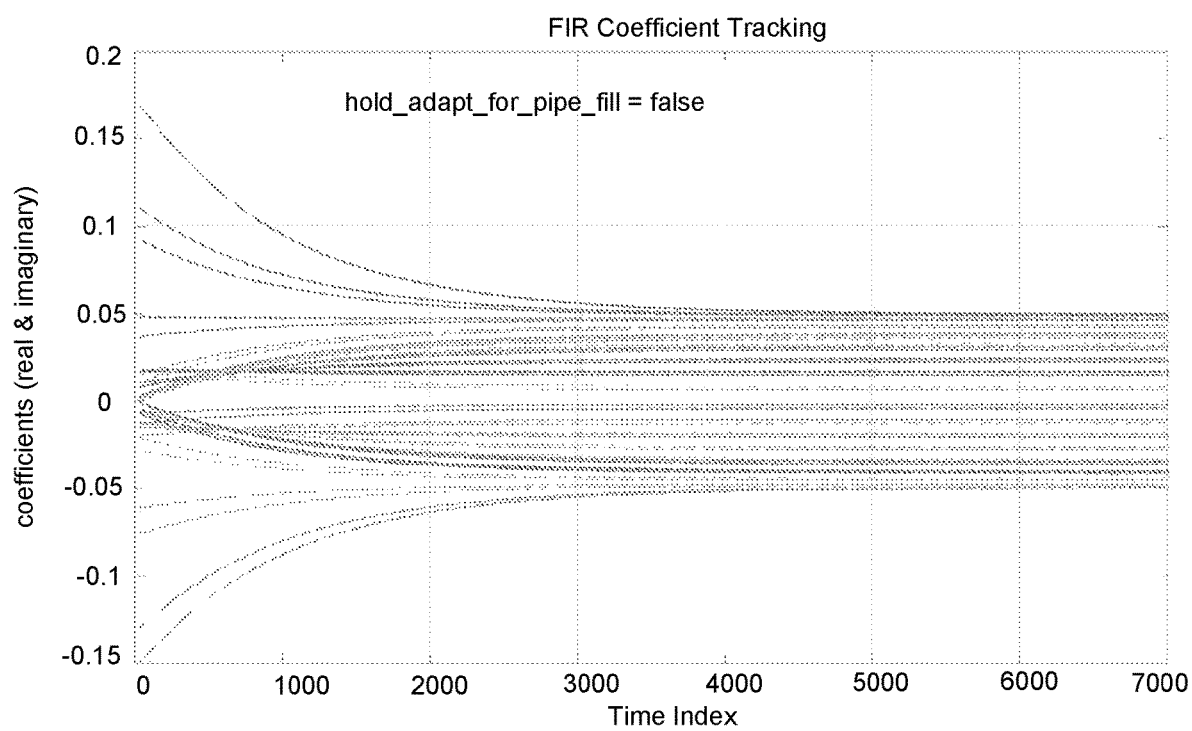
FIGS. 8 and 9 are graphs illustrating the settling of FIR coefficients without and with a hold-off, respectively, to freeze adaptation until a FIR delay line is filled in accordance with the present invention.
Figure 9:
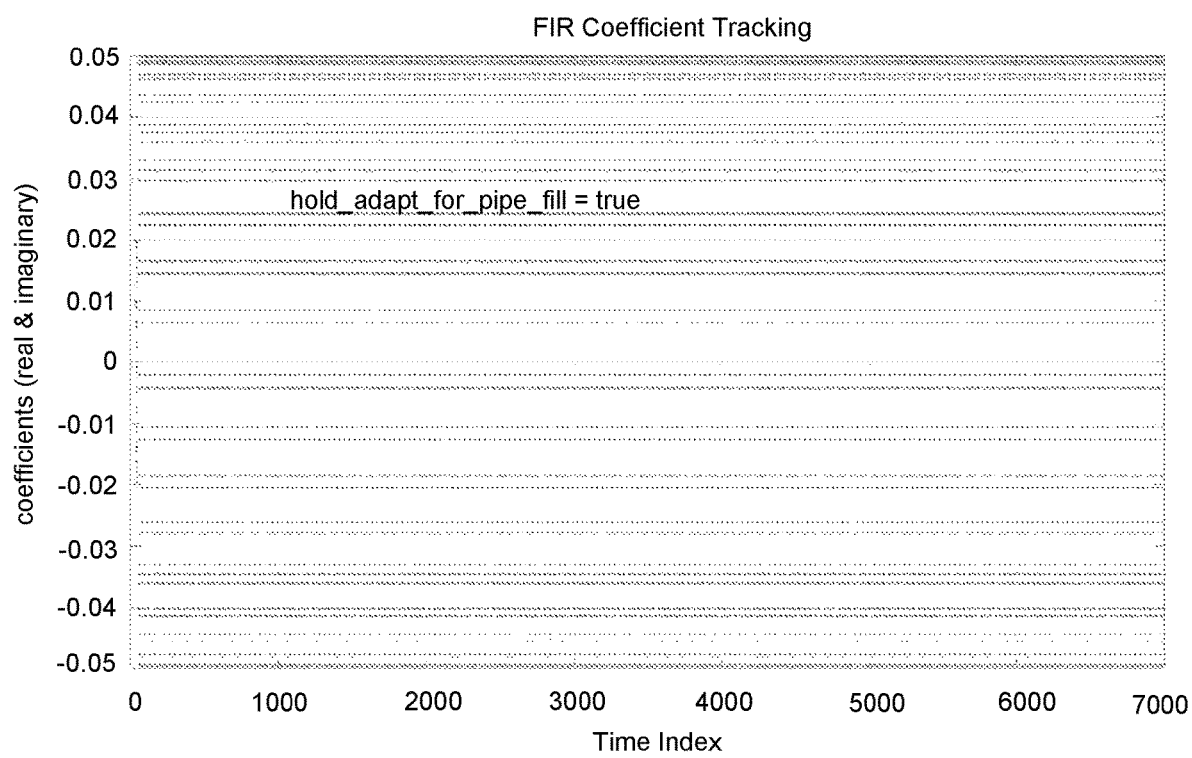

More telling is to look at the settling of the FIR coefficients themselves, illustrated in FIGS. 8 and 9, where the settling is illustrated without and then with a hold-off that freezes adaptation until the FIR delay line is filled, respectively.

Figure 10:
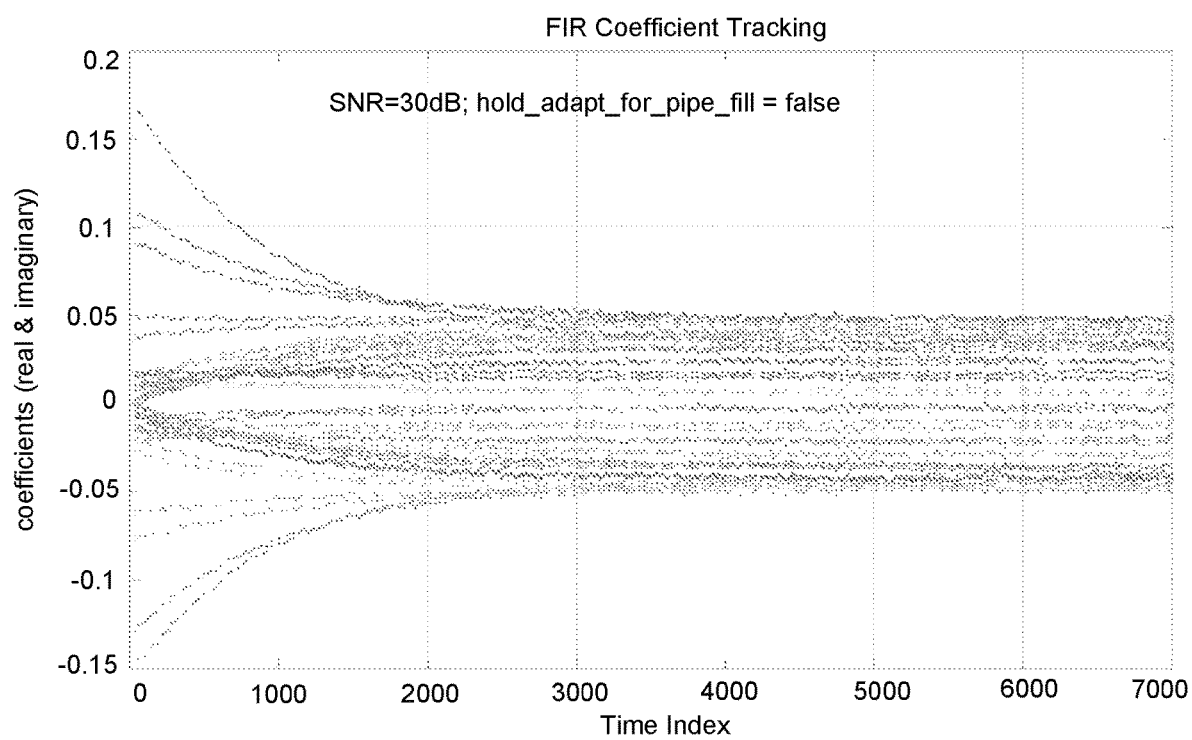
FIGS. 10 and 11 are graphs illustrating exemplary start-up transients with extended settling times in accordance with the present invention.
Figure 11:
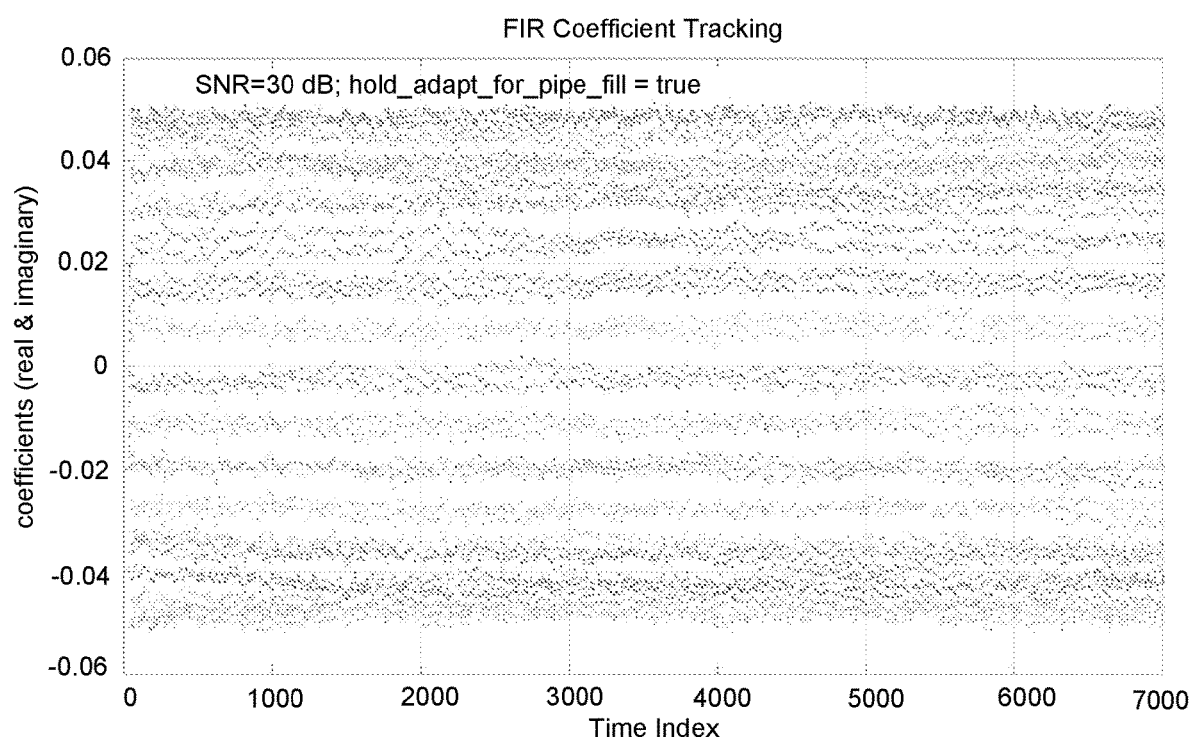

As can be seen by comparing the two plots of FIGS. 8 and 9, allowing adaptation while the FIR delay line is filling causes a start-up transient in the FIR coefficient values which takes a very long time (several thousand samples) to settle out, but is pretty much invisible in the error residual curve. This can be attributed to the fact that one of the zeros (roots) of the FIR filter settles very quickly to notch out the CW interfering tone, while all the rest of the FIR zeros (roots) take some time to settle to their final positions. There is not really much error energy to drive these zeros to any particular position. This is due possibly to numerical noise on the order of digital quantization errors. The same basic behavior with the same basic settling time can be observed even when some white Gaussian noise (WGN) is added to the simulated. This is illustrated in FIGS. 10 and 11.

Figure 12:
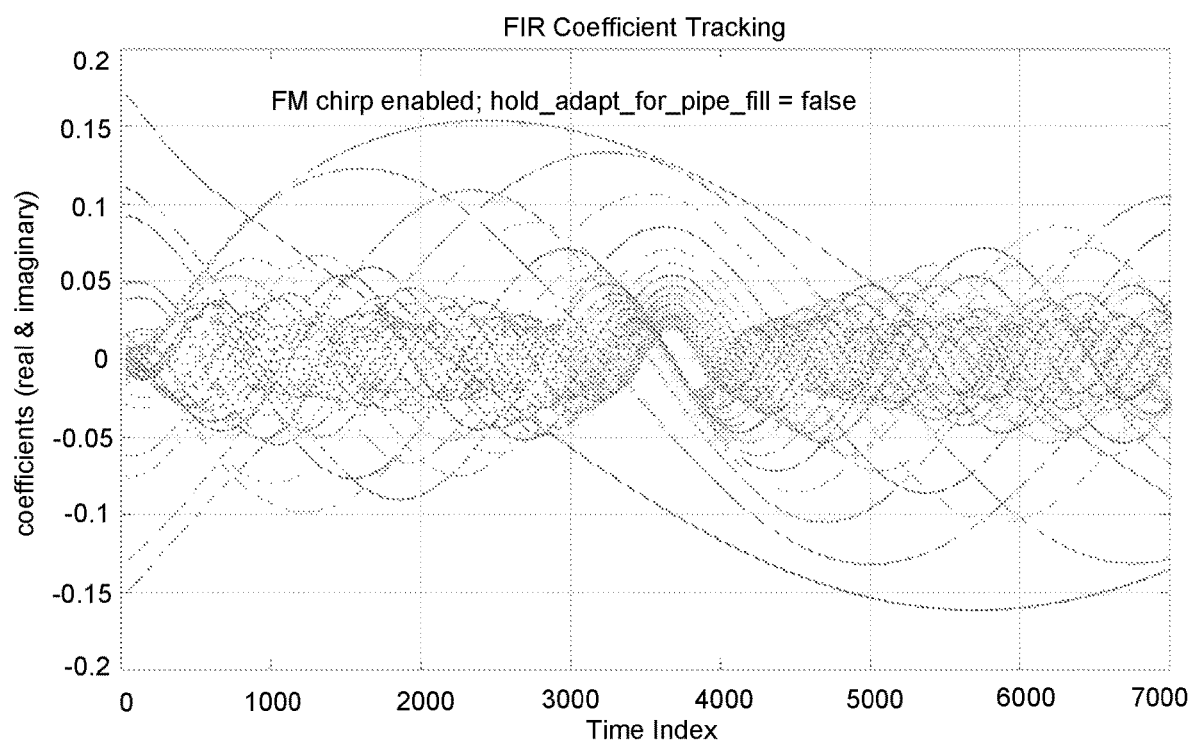
FIG. 12 is a graph illustrating a long settling time of FIR coefficients that is obscured by coefficient tracking of a frequency modulated chirp in accordance with the present invention.

When the interference is a chirp instead of a constant-frequency tone, the long settling time of the coefficients due to the pipe-filling transient is mostly obscured by the coefficient tracking of the FM chirp, illustrated in FIG. 12.

Figure 13:
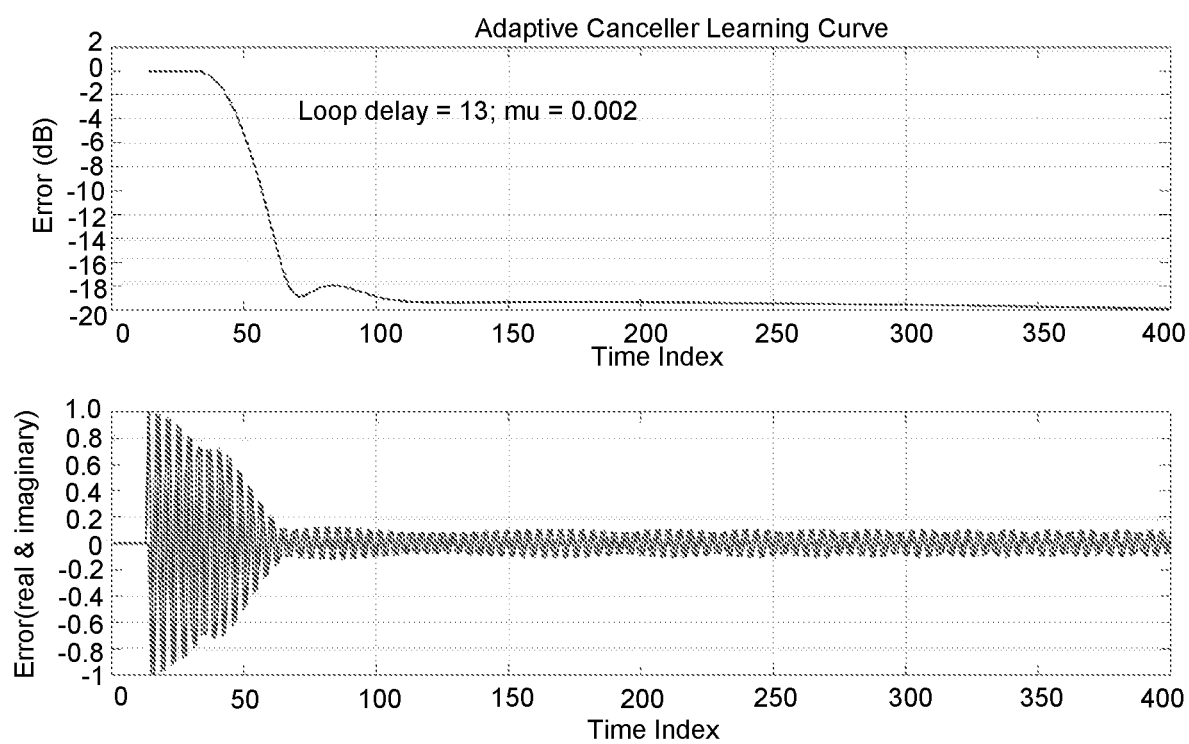
FIG. 13 is a graph illustrating an exemplary adaptive canceller learning curve in accordance with the present invention.

Loop Delay:

In an exemplary simulation, the effect of register-transfer level (RTL) pipeline stages are not included in the exemplary adaptation loop (810, 820, 830, and 840 of FIG. 26). This means that all of the continuous power mode simulation plots (FIGS. 5-12) are idealized. The amount of RTL pipelining delay in an exemplary RTL is 13 clock cycles. In a worst case, the clock rate and symbol rate will be the same (and the FCU normally operates at symbol rate) so the loop delay is 13 samples. For lower symbol rates, the loop delay may be fewer samples. When a realistic loop delay is added to the model (e.g., a model created using mathematical modeling software, such as MATLAB®), it becomes necessary to turn down the adaptive loop gain (mu) in order to preserve stability. A settling of mu=0.002 (reduced by a factor of 10) seems to provide almost as much stability margin (but not quite, its slightly underdamped) as 0.02 did without the loop delay. The leakage factor of 0.999 seems to still be suitable. FIG. 13 illustrates an exemplary adaptive canceller learning curve for this case.

Note that the settling time has increased from 30 samples to 70 (or 120, depending on what is considered "settled"). Also note that the cancellation never gets better than about −20 dB, compared to −40 dB without the loop delay in the model. The latter is primarily because the smaller mu has more trouble tracking the fast frequency change of this chirp.

Figure 14:
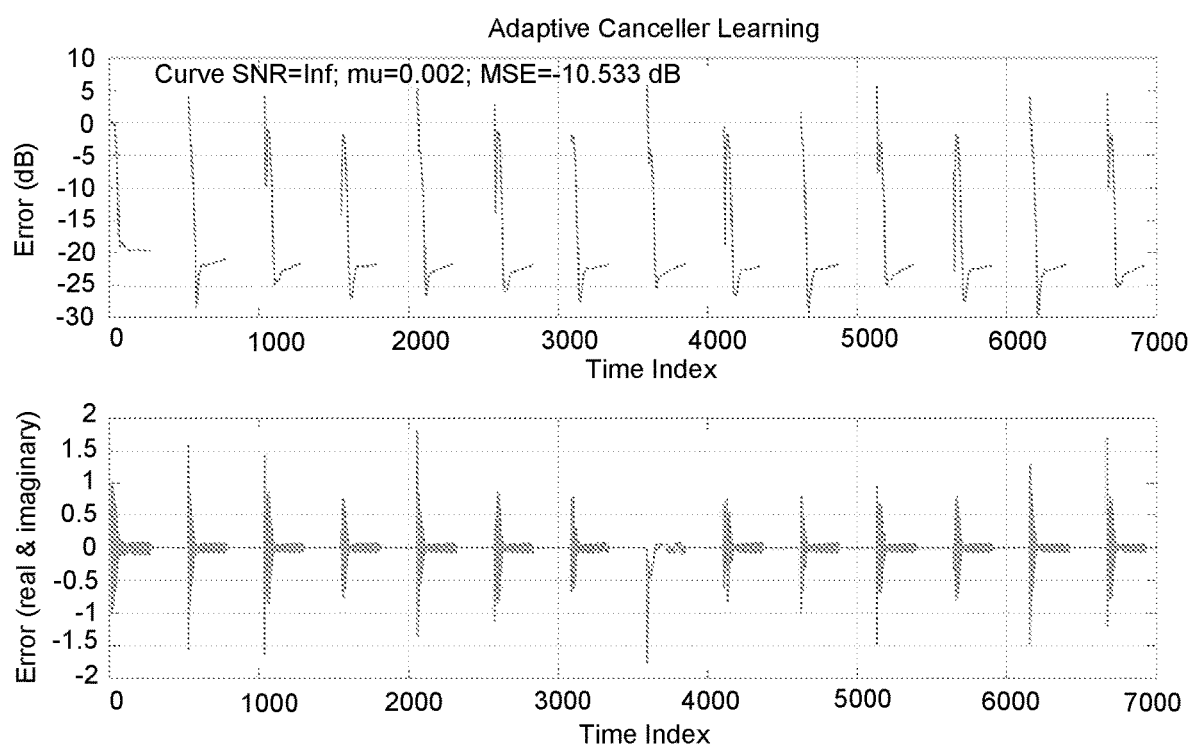
FIG. 14 is a graph illustrating a variable power mode modeled where a settling transient appears at the beginning of each receive window in accordance with the present invention.

Hereinafter, a loop delay of 13 samples will be included. In one exemplary embodiment, a variable power mode is modeled (e.g., in a MATLAB script) by zeroing out 256 out of every 512 signal samples and freezing adaptation during this time. This causes a settling transient to appear at the beginning of each receive window, as illustrated in FIG. 14.

Figure 15:
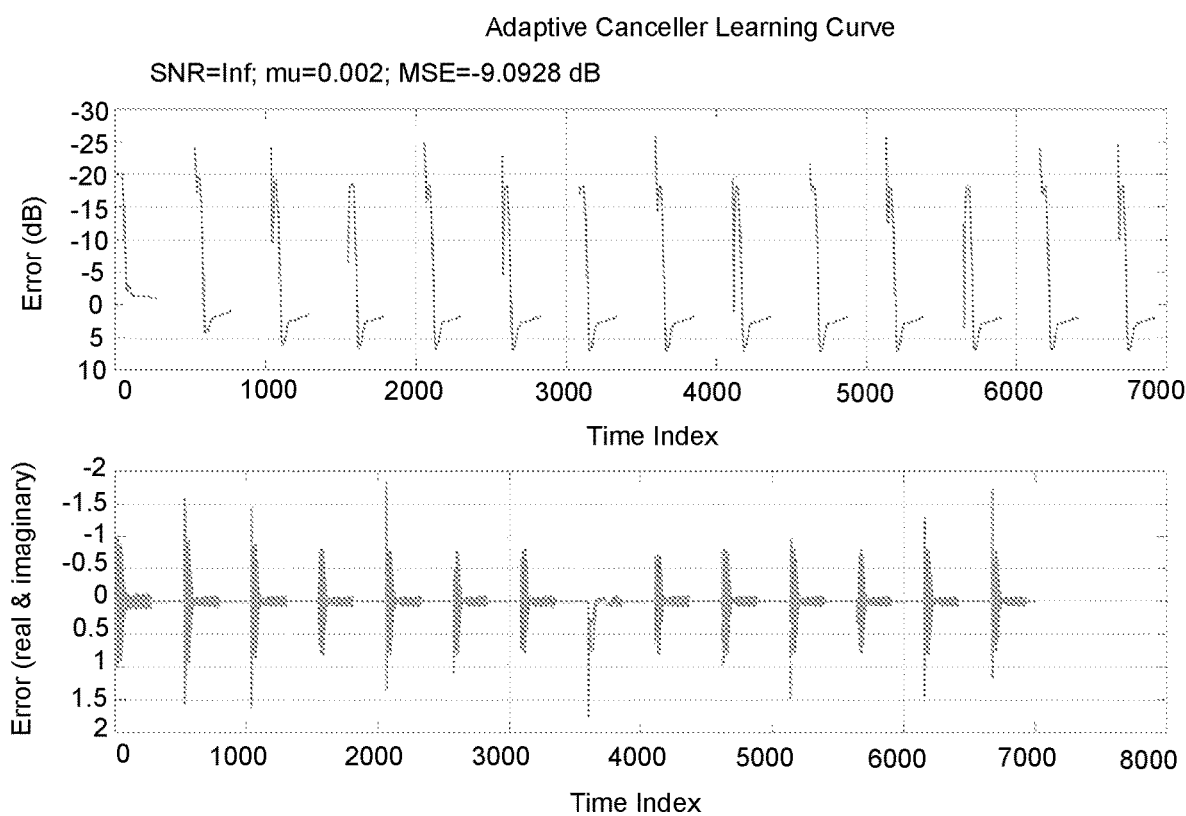
FIG. 15 is a graph illustrating an effect of enabling an adaptation hold-off during delay line filling in accordance with the present invention.

FIG. 15 illustrates the effect of enabling the adaptation hold-off during delay line filling. As illustrated in FIG. 15, enabling the adaptation hold-off during delay line filling changes the picture a little, but does get rid of the transients at the start of each receive pulse.

A proposed solution is to make an initial training pass with the data from each pulse before producing output to the downstream blocks. Because the frequency of the LFM chirp changes over the pulse, the training pass is run backwards so that the state of the FIR filter coefficients at the end of the training corresponds to the chirp frequency at the beginning of the pulse. It turns out that only a portion of the pulse needs to be used in the backwards training pass. The error learning curve with the backwards training section prior to each pulse is illustrated in FIG. 16.

Figure 16:
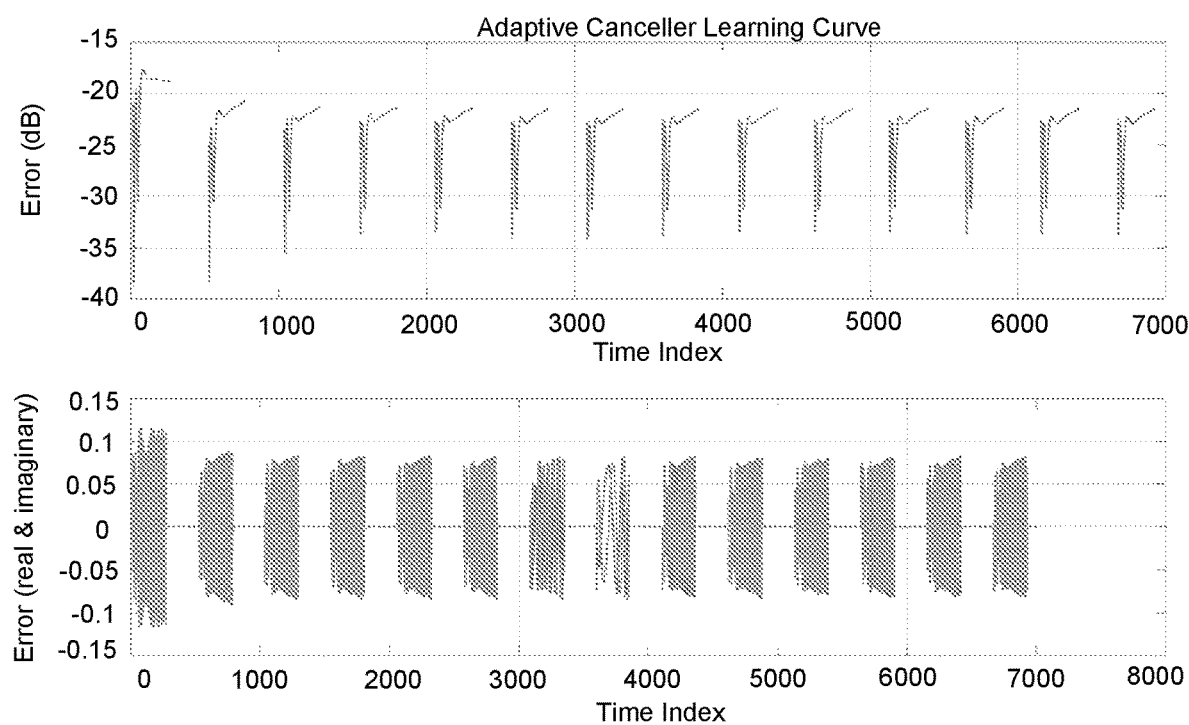
FIG. 16 is a graph illustrating an exemplary error learning curve with a backwards training section prior to each pulse in accordance with the present invention.

As illustrated in FIG. 16, the transients are now much smaller and no longer dominate the MSE averaged over the pulse. Part of the secret to the absence of big transients in the above plot is to make sure the delay line of the FIR filter starts with a "valid" signal when forward operation begins after the backward training pass. For the first FIR output sample, the delay line should be filled with received samples from prior to the beginning of the receive window (i.e., that was never actually received). These samples can be estimated, however, by running the backward training pass beyond the beginning of the receive pulse (into negative look-ahead time indices) by an amount equal to the length of the FIR delay line (20 samples).

Figure 17:
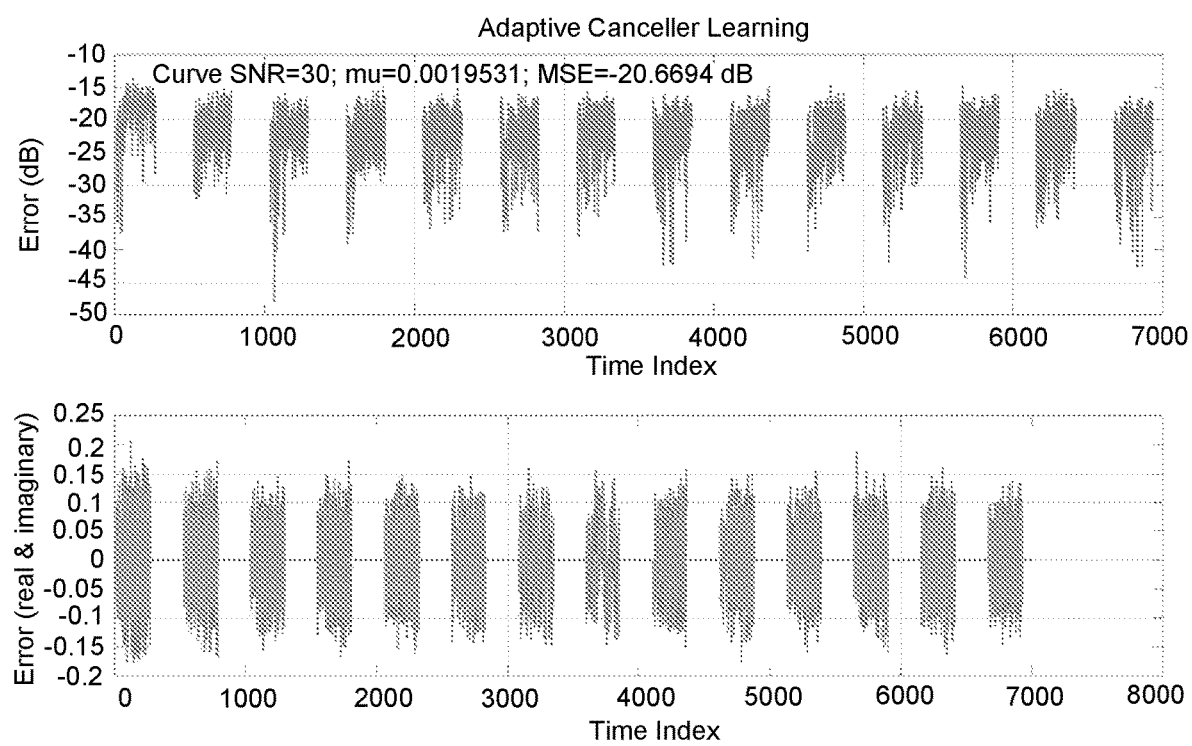
FIG. 17 is a graph illustrating a mu of $2^{-9}$ and an 80-sample look-ahead in accordance with the present invention.

The training time (number of samples required in the backward training pass) depends on the adaptation loop gain, mu. And in turn, the appropriate setting for mu involves some tradeoffs. A larger mu helps with tracking a fast-changing chirp frequency with less lag and greater suppression, and helps reduce the settling time (and backwards training time). A smaller mu helps to track a noisy tone more accurately, in situations where the tone is not too far above the noise floor. At very large values of mu, the adaptive loop becomes unstable. All things considered, it appears that the most interesting mu settings with 13 samples of loop delay are $2^{-9}$ or $2^{-10}$. At $2^{-10}$, 200 look-ahead samples are required in the backward training pass to achieve the performance potential. At $2^{-9}$, 80 look-ahead samples are required. In either case, the number of operation cycles of the backward predictor is 20 (length of the FIR) more than the quoted look-ahead because of the part at the end of the training pass where the "artificial history" is constructed to initialize the FIR delay line. When the symbol rate is lower than the clock rate, and hence the loop delay as measured in FCU samples is lower than 13, some larger values of mu may be useable (up to about $2^{-5}$ with zero delay) and a smaller look-ahead may be adequate. This simulation with mu=$2^{-9}$ and an 80-sample look-ahead is illustrated in FIG. 17, with an SNR of 30 dB on the FMCW tone.

Note that the interfering FMCW signal has been attenuated by approximately 20 dB. Changing mu to $2^{-10}$ and with a 200-sample look-ahead, the result is illustrated in FIG. 18.

Therefore, the reduction in mu has resulted in about 4 dB less attenuation of the FMCW interferer. However, the smaller mu may perform better when the FMCW chirp frequency ramp is slower, and/or the SNR is lower.

Figure 18:
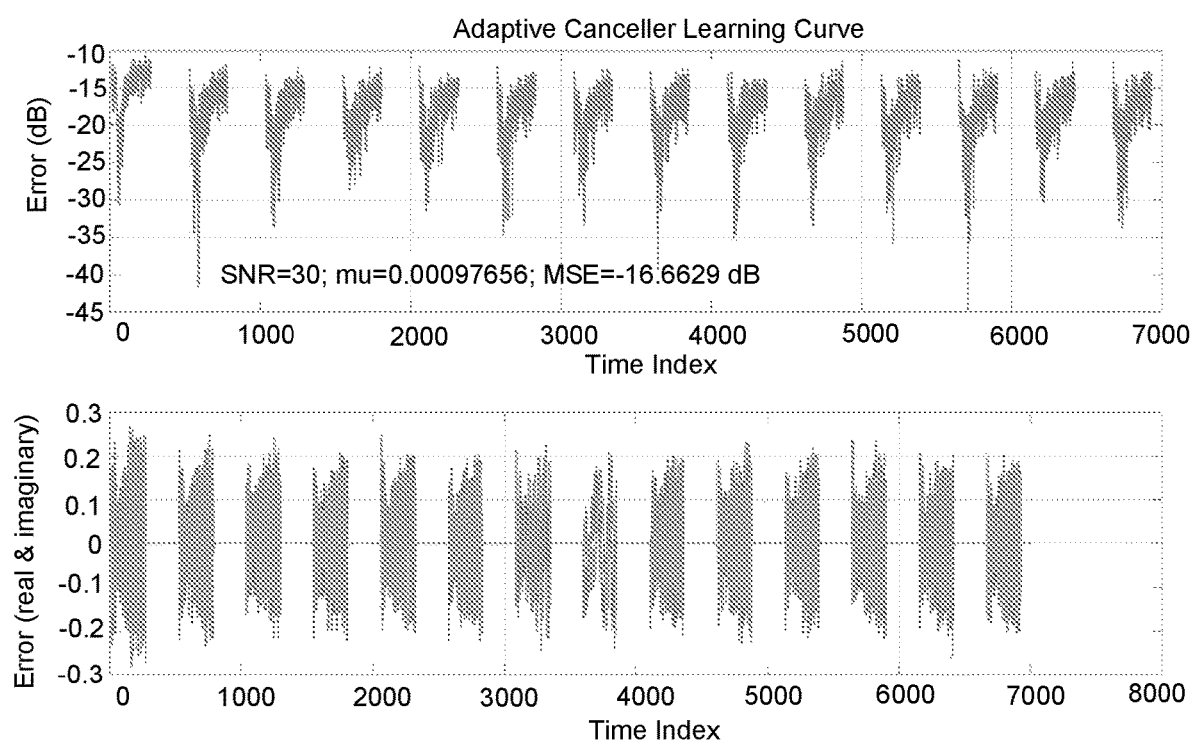
FIG. 18 is a graph illustrating a mu of $2^{-10}$ and a 200-sample look-ahead in accordance with the present invention.
Figure 19:
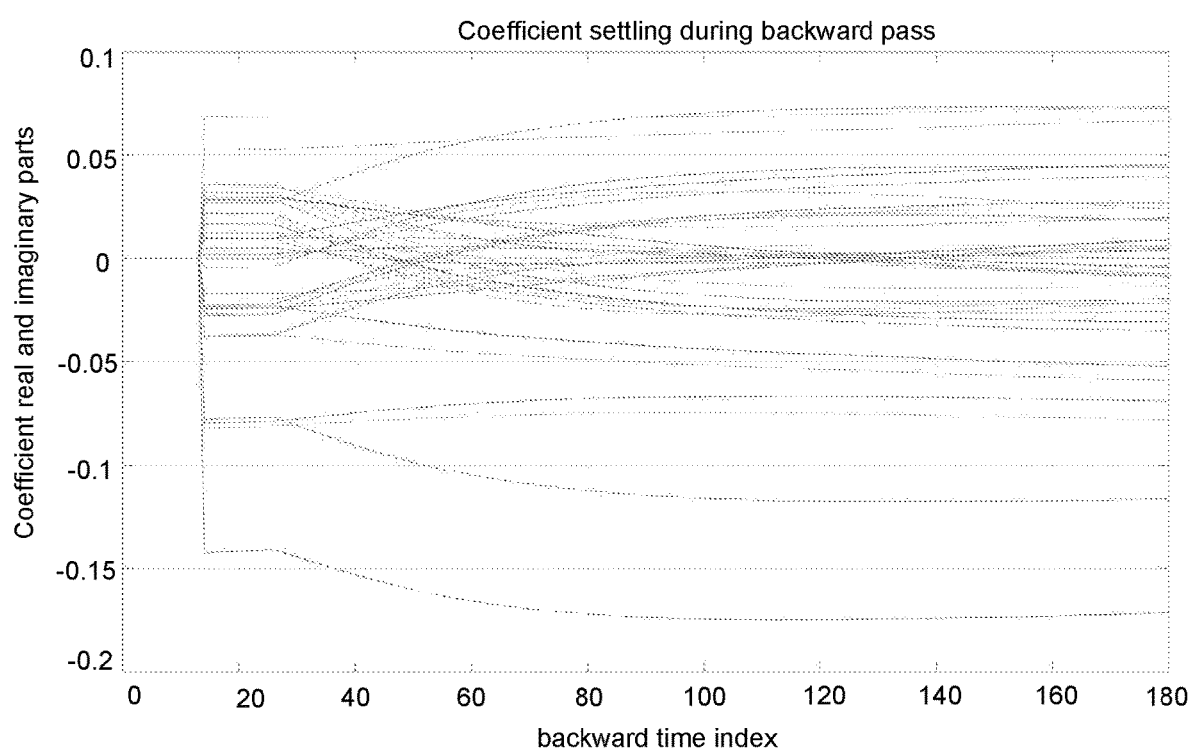
FIG. 19 is a graph illustrating the settling of coefficients for a representative pulse during a backward training pass in accordance with the present invention.

The settling of the coefficients for a representative pulse during the backward training pass corresponding to the same test conditions as illustrated in FIG. 18, is illustrated in FIG. 19.

Figure 20:
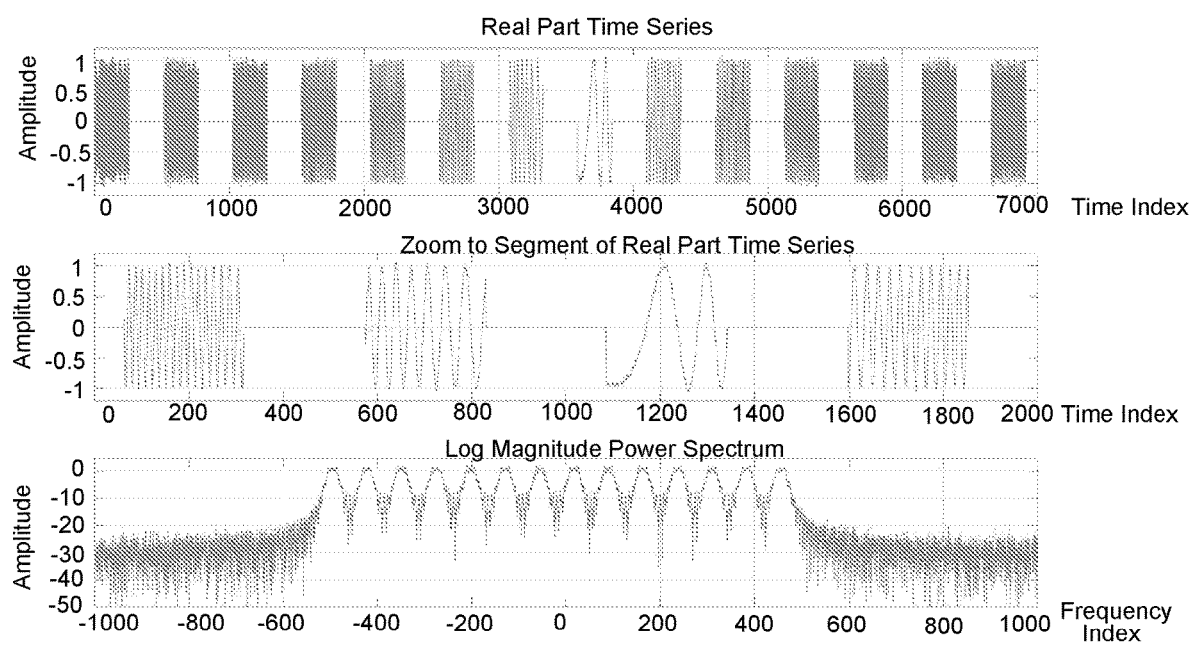
FIG. 20 is a graph illustrating additional amplitude plots in accordance with the present invention.

The other plots produced by the model (e.g., MATLAB scripts) for the same simulation as the two plots discussed above, are illustrated in FIG. 20 for completeness.

Figure 21:
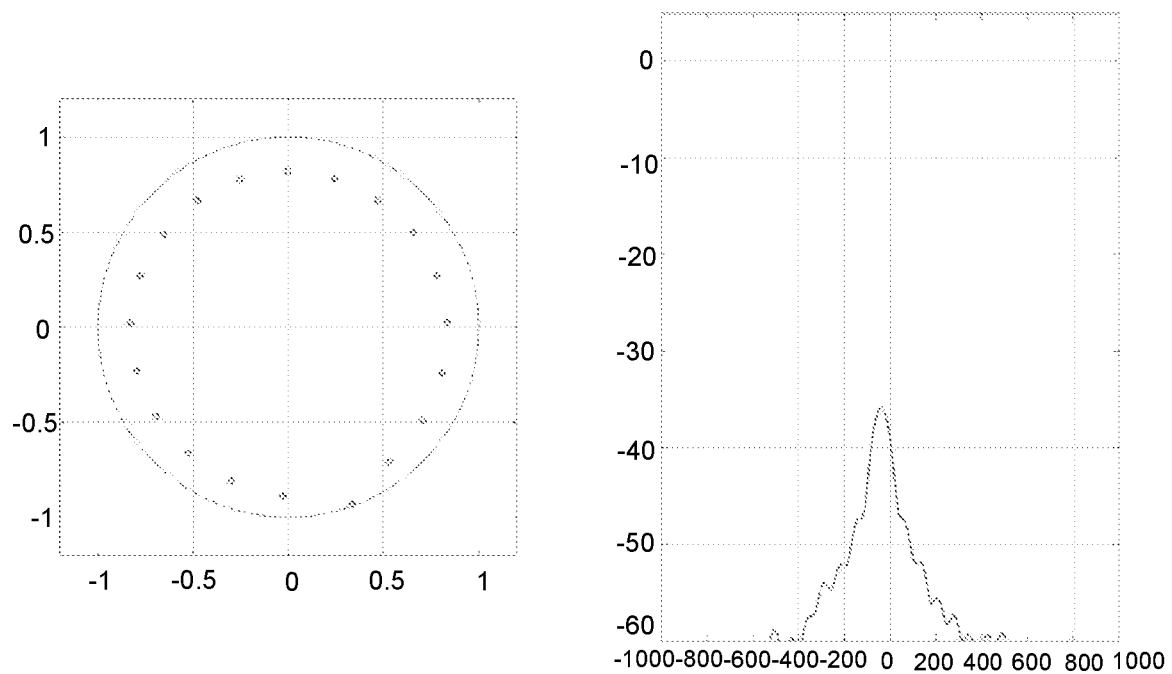
FIG. 21 is a graph illustrating the plotting of FIR zeroes at the end of a simulation in accordance with the present invention.
Figure 22:
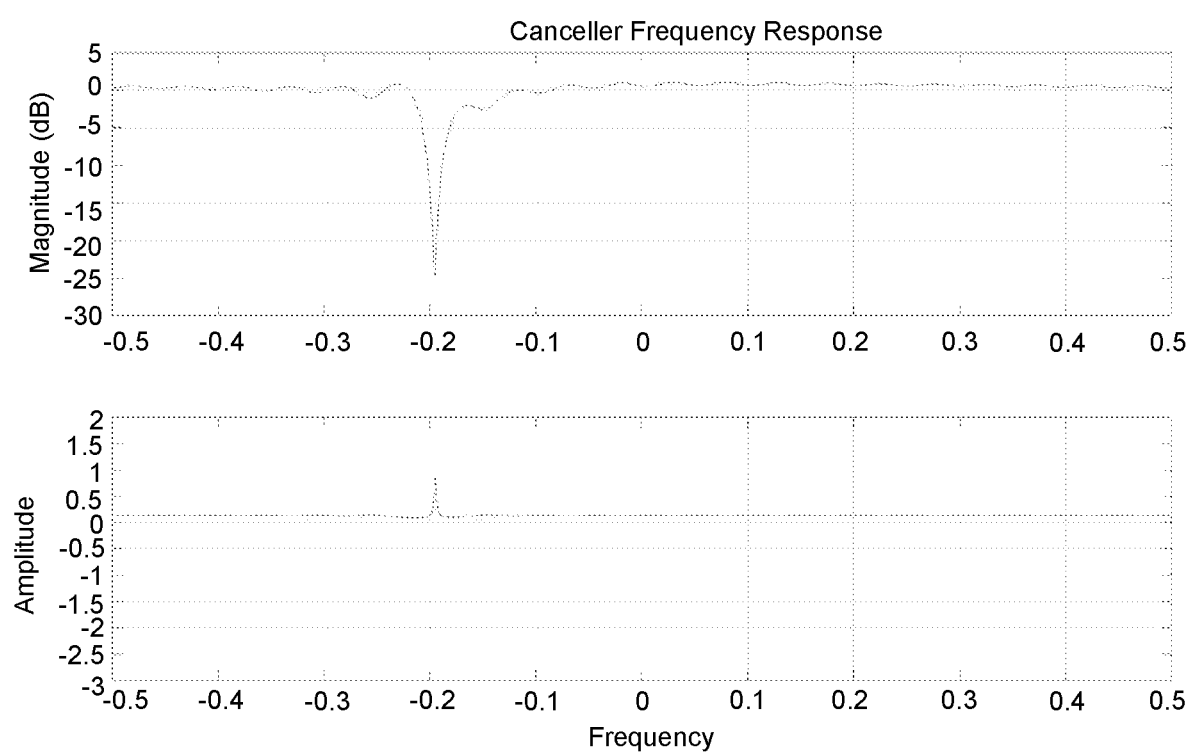
FIG. 22 is a graph of exemplary frequency plots illustrating the position of a canceller notch at the end of an FMCW ramp in accordance with the present invention.

Note that the FIR zeros plotted in FIG. 21 represent the end of the simulation, after the completion of the chirp ramp in frequency. The right-hand plot is simply the FFT of a windowed portion of the input signal near the end of the simulation run, so it shows the interfering tone itself, with some spectral spreading due to the observation windowing inherent in variable power mode. The frequency response plots illustrated in FIG. 22 are also taken from the end of the simulation run, so they illustrate the position of the canceller notch at (actually near, not at) the end of the FMCW ramp.

Figure 23:
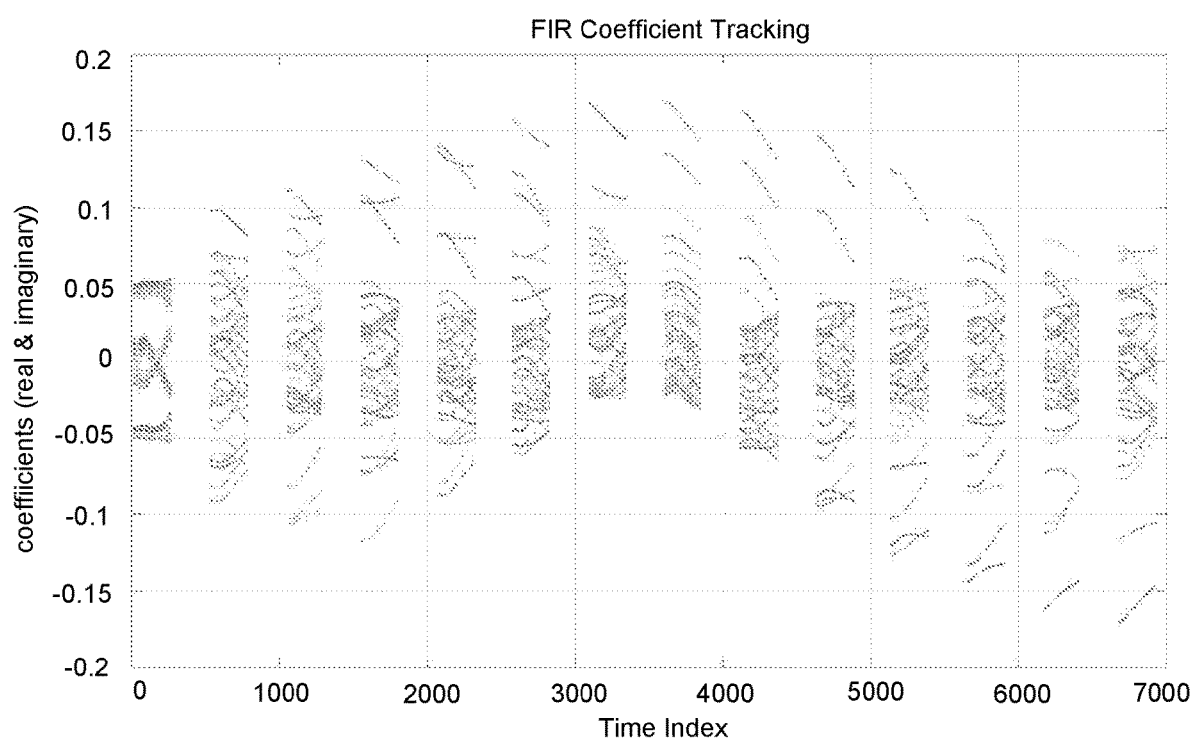
FIG. 23 is a graph illustrating coefficient tracking in accordance with the present invention.

The coefficient tracking illustrated in FIG. 23 has counterintuitive step functions in coefficient value from one receive pulse window to the next. This is due to the fact, discussed herein, that the "other" zeros of the FIR filter settle much more slowly than the "important" zero that notches the FMCW tone, and consequently the FIR coefficients continue to drift as these other zeros move around (in addition, it appears that these "unused" zeros may want to settle to different locations during the backward pass as compared to the forward operation). Although psychologically unsettling to an astute observer, this effect does not seem to have a detrimental impact on the cancellation performance of the architecture.

The exemplary embodiments disclosed herein cover many variations of PMCW radar systems. As discussed herein, an exemplary PMCW radar system with frequency modulated interference mitigation includes a linear frequency modulation canceller (FCU) that includes a FIR filter per receive path, and is configured as a linear predictor with an LMS adaptation. The prediction is subtracted from the FIR input signal, which forms the error signal that drives the adaption and also comprises an FMCW canceler output. Reduced transient levels at the beginning of each receive pulse may be achieved by delaying the adaptation, such that coefficients of FIR filters are filled with valid signal samples before the adaptation, and a person of normal skill in the art can derive many other variations using the principles exposed herein without departing from the spirit and scope of the invention as described by the attached claims.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A radar sensing system comprising:
   at least one transmitter configured for installation and use on a vehicle, and configured to transmit phase-modulated continuous wave radio signals;
   at least one receiver configured for installation and use on the vehicle, and configured to receive radio signals that include (i) the transmitted radio signals transmitted by the at least one transmitter and reflected from objects in the environment, and (ii) interfering frequency-modulated radio signals transmitted by another radar sensing system;
   a controller configured to control the at least one transmitter and the at least one receiver such that the at least one transmitter and the at least one receiver operate in alternating transmit and receive windows, wherein the transmit window and the receive window are separated in time;

wherein each receiver of the at least one receiver comprises a linear frequency modulation canceler configured to mitigate the interfering radio signals received by the associated receiver, such that the associated receiver is able to estimate a location of an object; and wherein the linear frequency modulation canceler comprises a finite impulse response (FIR) filter and is configured as a 1-step linear predictor with least mean squares adaptation, wherein the prediction is subtracted from an FIR input signal to generate an error signal that drives the adaptation, and wherein the linear frequency modulation canceler generates the canceler output.

2. The radar sensing system of claim 1, wherein the controller is configured to control the adaptation on a first receiver, and wherein FIR coefficients for any other receivers of the at least one receiver are copied from the first receiver, wherein the adaptation is a FIR adaptation.

3. The radar sensing system of claim 1, wherein the controller delays the adaptation such that transients at the start of each receive window are avoided.

4. The radar sensing system of claim 1, wherein the FIR filter comprises a maximum of 15 taps.

5. The radar sensing system of claim 3, wherein the controller is configured to delay the FIR adaptation until a delay line of the FIR filter has filled with valid signal samples, and further configured to perform a training pass to fill FIR filter coefficients with the samples before the FIR adaptation begins.

6. The radar sensing system of claim 5, wherein the training pass is run backwards so that the FIR filter coefficients at the end of the training corresponds to a chirp frequency at the beginning of the receive window.

7. A method for mitigating frequency modulated interference in a radar sensing system, the method comprising:
providing a plurality of transmitters configured for installation and use on a vehicle;
providing a plurality of receivers configured for installation and use on the vehicle;
transmitting, with the transmitters, phase-modulated radio signals;
receiving, with the receivers, radio signals, wherein the received radio signals include (i) the transmitted radio signals transmitted by the transmitters and reflected from objects in the environment, and (ii) interfering frequency-modulated radio signals transmitted by another radar sensing system;
controlling the transmitters and the receivers such that the transmitters and the receivers operate in alternating transmit and receive windows, wherein the transmit windows are separated in time from the receive windows;
wherein each receiver of the plurality of receivers comprises a linear frequency modulation canceler; and
mitigating, with a linear frequency modulation canceler, the interfering radio signals received by an associated receiver, such that the associated receiver is able to estimate a location of an object; and
wherein the linear frequency modulation canceler comprises a finite impulse response (FIR) filter and is configured as a 1-step linear predictor with least mean squares adaptation, wherein the prediction is subtracted from an FIR input signal to generate an error signal that drives the adaptation, and wherein the linear frequency modulation canceler generates the canceler output.

8. The method of claim 7 further comprising controlling the adaptation on a first receiver of the plurality of receivers, and copying FIR coefficients from the first receiver to the other receivers of the plurality of receivers, wherein the adaptation is a FIR adaptation.

9. The method of claim 7, wherein the FIR filter comprises a maximum of 15 taps.

10. The method of claim 7 further comprising delaying the adaptation such that transients at the start of each receive window are avoided.

11. The method of claim 10 further comprising delaying the adaptation until a delay line of the FIR filter has filled with valid signal samples, and performing a training pass to fill FIR filter coefficients with the samples before the adaptation begins.

12. The method of claim 11, wherein the training pass is run backwards so that the FIR filter coefficients at the end of the training corresponds to a chirp frequency at the beginning of the receive window.

13. A radar sensing system comprising:
a transmitter configured to transmit phase-modulated continuous wave radio signals;
a receiver configured to receive radio signals that include (i) the transmitted radio signals transmitted by the transmitter and reflected from objects in the environment, and (ii) interfering frequency-modulated radio signals transmitted by another radar sensing system;
a controller configured to control the transmitter and the receiver such that the transmitter and the receiver operate in alternating transmit and receive windows, wherein the transmit window and the receive window are separated in time;
wherein the receiver comprises a frequency modulation canceller configured to cancel a substantial portion of the interfering radio signals received by the receiver, such that the receiver is able to estimate a location of an object; and
wherein the frequency modulation canceler is a linear frequency modulation canceler, and wherein the linear frequency modulation canceler comprises a finite impulse response (FIR) filter and is configured as a 1-step linear predictor with least mean squares adaptation, wherein the prediction is subtracted from an FIR input signal to generate an error signal that drives the adaptation, and wherein the linear frequency modulation canceler generates the canceler output.

14. The radar sensing system of claim 13, wherein the interfering radio signals are modulated with a linear frequency modulation.

15. The radar sensing system of claim 13, wherein the controller delays the adaptation such that transients at the start of each receive window are avoided.

16. The radar sensing system of claim 13, wherein the controller is configured to delay the FIR adaptation until a delay line of the FIR filter has filled with valid signal samples, further configured to perform a training pass to fill FIR filter coefficients with the samples before the FIR adaptation begins, and wherein the training pass is run backwards so that the FIR filter coefficients at the end of the training corresponds to a chirp frequency at the beginning of the receive window.

\* \* \* \* \*